United States Patent [19]
Ishii et al.

[11] Patent Number: 5,275,725
[45] Date of Patent: Jan. 4, 1994

[54] FLAT SEPARATION MEMBRANE LEAF AND ROTARY SEPARATION APPARATUS CONTAINING FLAT MEMBRANES

[75] Inventors: Kiyoshi Ishii, Tokyo; Yoshitada Matsumoto, Hyogo, both of Japan

[73] Assignee: Daicel Chemical Industries, Ltd., Tokyo, Japan

[21] Appl. No.: 936,263

[22] Filed: Aug. 26, 1992

Related U.S. Application Data
[63] Continuation-in-part of Ser. No. 867,689, Jul. 10, 1992.

[30] Foreign Application Priority Data
Nov. 30, 1990 [JP] Japan .................................... 2-34453
Apr. 28, 1991 [JP] Japan .............................. 3-68632[U]

[51] Int. Cl.⁵ ............................................ B01D 63/16
[52] U.S. Cl. ......................... 210/321.67; 210/321.75; 210/321.84; 210/331; 210/500.21; 210/506
[58] Field of Search ............ 210/321.6, 321.64, 321.67, 210/321.72, 321.75, 321.84, 359, 324, 330, 331, 500.21, 506–

[56] References Cited
U.S. PATENT DOCUMENTS
4,894,155 1/1990 Leoncavallo et al. ......... 210/321.84

*Primary Examiner*—Frank Sever

[57] ABSTRACT

The present invention provides a flat separation membrane leaf, which is characterized by consisting of a flat membrane support comprising an inner layer having a coarse structure and surface layers comprising a nonwoven fabrics having a dense structure, wherein the surface layers are integrated with the inner layer interposed between them, and semipermeable membranes covering both sides of the support in such a manner that the semipermeable membranes penetrates into the openings of the nonwoven fabrics of the surfaces of the support to combine the semipermeable membranes with the surfaces of the support. The invention provides also a flat separation membrane element which comprises, as the essential component, the above-described flat separation membrane leaf.

18 Claims, 13 Drawing Sheets

FLAT SEPARATION MEMBRANE LEAF AND ROTARY SEPARATION APPARATUS CONTAINING FLAT MEMBRANES

This is a continuation-in-part of copending application Ser. No. 07/867,689 filed on Jul. 10, 1992, now pending.

FIELD OF THE INVENTION

The present invention relates to a flexible, flat separation membrane leaf, which will hereinafter be referred to simply as "membrane leaf" in some cases, which can be cleaned by back permeation and used in the technology of membrane separation of a fluid, such as reverse osmosis, ultrafiltration and microfiltration, and in the technology of membrane separation of a gas, and a separation membrane element.

The present invention also relates to a rotary separation apparatus comprising flat membranes and another members.

Figure 1:
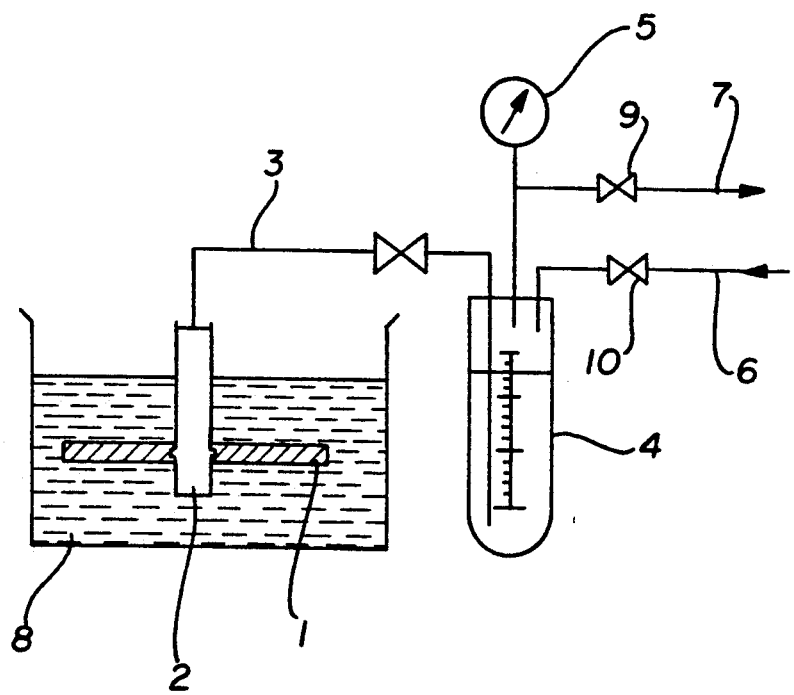
FIG. 1 is a schematic section of an apparatus for measuring the permeation flux of pure water through a separation membrane used in Examples 1–3 and Comparative Example 1.

1 . . . separation membrane leaf, 2 . . . acrylic resin tube, 3 . . . pressure resistant tube, 4 . . . trap, 5 . . . manometer, 6 . . . nitrogen gas supply line, 7 . . . vacuum line, 8 . . . pure water, 9 . . . valve, 10 . . . valve, 11 . . . projection, 12 . . . hole, 13 . . . outer frame, 14 . . . bearing, 15 . . . outer cylinder, 16 . . . support plate, 22 . . . pin hole, 23 . . . recess, 24 . . . through hole, 25 . . . projected portion, 26 . . . incorporated portion, 27 . . . outlet port, 28 . . . central port, 29 . . . rotary shaft, 30 . . . cylindrical case, 31 . . . interior (inner layer) of membrane leaf, 41 . . . hollow shaft, 51 . . . rotary separation apparatus comprising flat membranes, 52 . . . membrane support member, 53 . . . separation membrane, 54 . . . membrane leaf, 55 . . . annular spacer, 56 . . . hollow tube, 57 . . . small hole, 58 . . . hollow, 59 . . . partition, 60 . . . stress-break-up hole, 61 . . . cylindrical case, 62 . . . fluid-feed port, 63 . . . condensate discharge port, 64 . . . hollow rotary shaft, 65 . . . partition, 66 . . . small hole, 67 . . . flat membrane support, 68 . . . separation membrane, 69 . . . flat membrane leaf, 70 . . . hollow of rotary shaft, 71 . . . annular spacer, 72 . . . hole, 73 . . . feed flow passage, 74 . . . discharge flow passage, 75 . . . corotation preventing rod, 76 . . . bearing, 77 . . . pulley, 82 . . . fluid passing hole, 83 . . . fluid passing hole, 84 . . . bearing, 85 . . . pulley, 86 . . . clearance, 87 . . . projection (lug), 88 . . . corotation preventing rod, 89 . . . outer-frame wheel, 90 . . . partition locking rod, 91 . . . outer frame, 101 . . . rotary separation apparatus comprising flat membranes, 102 . . . valve, 103 . . . trap, 104 . . . manometer, 105 . . . three-way valve, 106 . . . vacuum line.

BACKGROUND OF THE INVENTION

One of the most serious problems in the technology of membrane separation of liquid is that the suspended solids, colloids, high-molecular solutes or the like in the liquid to be treated adheres to the surface of the membrane or the inner surface of each pore in the membrane to form a resistant boundary layer or to plug the pores, thereby causing a phenomenon of degrading the separation performance of the membrane. Various methods were proposed for relieving it. Recently, a method having a remarkable effect was proposed and attracted attention. In this process, for example, the permeate is forced to permeate to back for a short time periodically in the course of the operation to wash away the foulants deposited on the surface of the membrane or the plugged pores toward the untreated liquid side (the back permeation cleaning method) [see K. Matsumoto, M. Kawahara & H. Ohya, "J. Ferment. Technol.", Vol. 66, pages 199 to 205 (1988) and Japanese Patent Laid-Open No. 114/1991].

Although this method is employed in hollow fiber separation membranes, it is practically hardly employed in flat separation membranes. This is acknowledged to be one of the advantages of the hollow fiber membrane modules over the modules of other types. Among flat separation membranes, only the membrane part of a pectination type flat membrane module, a product of Romicon (U.S.A.), appears to be cleanable by back permeation. This module comprises a laminate of rectangular, resin-treated sheets of paper arranged at intervals in such a manner that one of the long sides thereof is fixed to a water-collecting plate so that they can communicate with each other, the whole surface of the resin-treated paper being covered with a membrane. The resin-treated paper is supposed to have such a high a mechanical strength that even when the internal pressure is elevated in the cleaning by back permeation, it will be neither broken nor expanded. Therefore, it is conceivable that if the membrane is sufficiently fixed to the resin-treated paper by anchoring effect into the vacancies between the fiber of the paper, the membrane will be kept from peeling-off by the back permeation stream and the back permeation cleaning will be possible. However, this module has a defect that since the resin-treated paper used as the support has no composite structure, the lateral flow resistance in the support is high and, therefore, the size and shape thereof are restricted (refer to U.S. Pat. No. 3,508,994).

The reason why the back permeation cleaning method which is employed for cleaning the hollow fibre separation membrane is scarcely employed for cleaning the flat separation membrane is as follows. Since the hollow fibre membrane per se has a pressure-resistant structure and no remarkable deformation thereof is caused by either a positive or negative pressure, the back permeation of a liquid is possible. On the contrary, even when the flat membrane is lined with a reinforcing material such as a nonwoven or woven fabric which is combined with a membrane, it per se is easily deformed under pressure and the original shape thereof before the application of the pressure cannot be kept. Under these circumstances, in the module wherein the flat membrane is used, an idea has been employed wherein the membrane is placed either on a pressure-resistant supporting plate having a passage for the permeate or on both sides of a supporting plate having a passage for the permeate, woven fabric or mesh to form a membrane leaf, thereby preventing it from being deformed by balancing the pressures on both sides (refer to U.S. Pat. Nos. 3,133,132, 3,133,137 and 3,872,015).

Although the membrane leaf is capable of maintaining its original shape against the positive pressure applied to the membrane surface, the membrane is easily lifted off the supporting plate, woven fabric or the like by the negative pressure applied for the cleaning by back permeation. Therefore, the pressure of the permeate applied for the purpose of the back permeation through the membrane is first wasted for the lifting and deformation of the membrane. Since the back permeation is not started before the deformation of the membrane has been completed, a means wherein only a small amount of the permeate is subjected to back permeation by only switching valves in the course of the operation is ineffective at all and even when the permeate is subjected to back permeation by means of a pump, the efficiency is very low. Further the membrane leaf is damaged due to the repeated deformation or the like.

On the other hand, gas-separation membrane modules disclosed in U.S. Pat. Nos. 2,597,907 and 3,332,216, etc., are known in the field of technology of membrane separation of gas. However, these modules also have problems of a flux decline due to very small particles such as dust and the deformation and damage of the membrane when it is thin.

To solve the problem of a flux decline, a permselective gas-separation membrane module wherein a porous covering material is applied to the surface of a gas-permeable membrane module was proposed (see Japanese Patent Laid-Open No. 199005/1983). However, it is necessary for this module to exchange the porous covering material.

Further, a permselective gas-separation membrane module, which comprises an elastic porous material having an interconnected bubble cell and a composite membrane consisting of an ultrathin permselective gas separation membrane and porous membrane, was proposed for solving the problem of the deformation and damage of the membrane (see Japanese Utility Model Publication No. 27609/1986). However, since the elastic porous material is not integral with the composite membrane, the central part of the permeable membrane might be expanded and, when it is restored to the former state by the pressure change, it wrinkles and/or breaks.

Another example of the supports having the composite structure in which no delamination occurs is a composite nonwoven fabric disclosed in Japanese Patent Laid-Open No. 238103/1985. However, this invention was made for the purpose of just preventing the strike-through of a dope which might occur when the dope is applied onto for forming the membrane. In this invention, the other undoped rear side or intermediate layer is made dense.

The following techniques used in an apparatus for and a method of membrane separation of a fluid to keep the separation performance of the membranes are also known.

In order to minimize the deterioration of the performance of a membrane which occurs due to the accumulation on the membrane of solute and solid matter which do not permeate therethrough, during a membrane separation of a fluid, a so-called cross-flow filtration method in which a fluid to be treated is sent along the membrane surface is generally used.

A cross-flow filtration method using a stationary membrane module in which a fluid to be treated is sent under pressure by a pump along the membrane surface at a predetermined current speed has heretofore been used in practice. In the case of, for example, the desalting of salt water or seawater with a reverse osmosis membrane, the influence of the current speed of the fluid to be treated upon the performance of the membrane appears mainly in the salt reduction rate thereof. In a treatment for fruit juice, a fermentation fluid or various kinds of waste waters which contain high molecular solute and suspended solid matter with an ultrafiltration membrane or a microfiltration membrane, the influence of the current speed of the fluid to be treated upon the performance of the membrane appears mainly in the permeation flux thereof.

In the ultrafiltration method and microfiltration method among the above-mentioned filtration methods, the resistance of a boundary layer is generally higher than the permeation resistance of the membrane itself, and it is not seldom that there is a not less than one-digit difference therebetween. In order to reduce such a high boundary resistance by using a cross-flow filtration method, it is necessary that the feed rate of a fluid to be treated be set very high. However, even when the feed rate of a fluid to be treated is set so high, the greater part of the fluid is discharged from the membrane module without permeating through the membrane, so that the greater part of a large amount of charged energy is wasted.

In order to minimize this loss, a method of recycling the greater part of the fluid to be treated which is discharged from the membrane module, to the inlet thereof by a circulating line without releasing the fluid pressure through a back pressure regulating valve is employed. Only the energy corresponding to the fluid pressure loss may be supplied supplementarily to this recycling fluid. However, even when this method is practiced, a pressure loss due to the high flow rate of the fluid is so large that the supplementing of a large quantity of energy is required. Moreover, when it is necessary to restrict the length of the fluid flow passage so that the inlet pressure does not exceed a limit pressure resistance of the membrane module, it has to be paralleled membrane modules. Namely, the power and equipment cost increases due to the increase of the feed rate of the fluid.

In order to solve these problems, a method of making a fluid to be treated relatively in the crossflow condition to the membrane surface by moving the membrane surface or an object and wall surface opposed to the membrane surface instead of feeding the fluid to a stationary membrane surface at a high speed has mainly been proposed.

Figure 13:
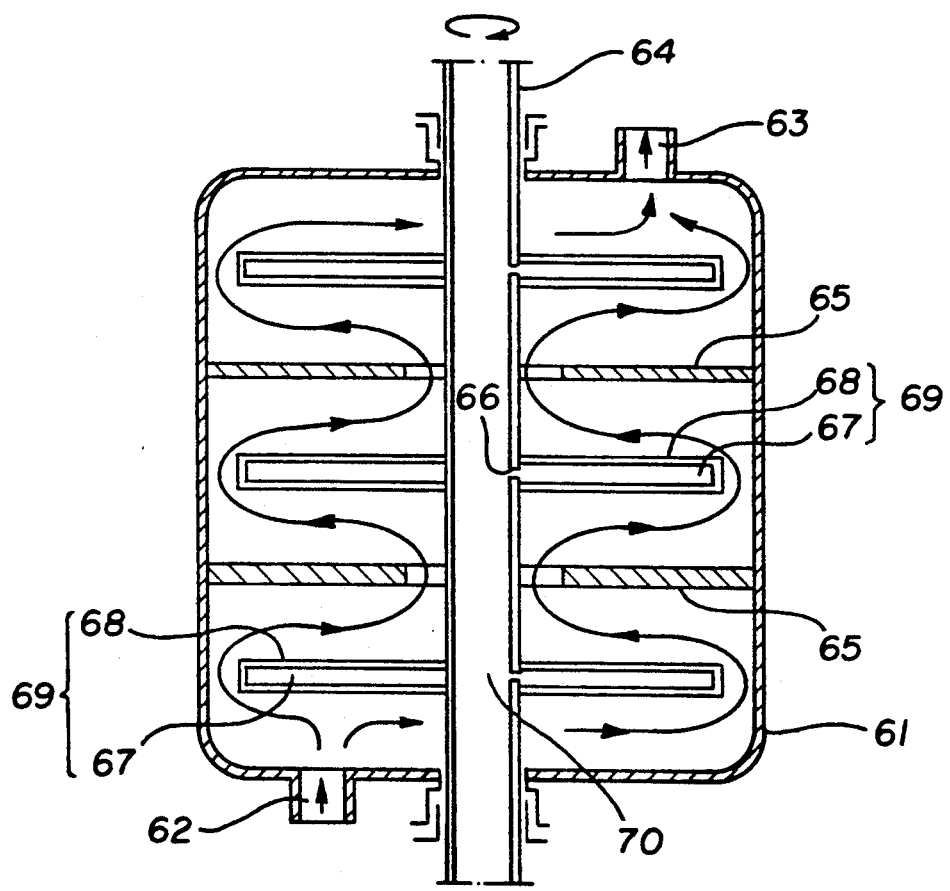
FIG. 13 is a longitudinal section of a conventional rotary separation apparatus comprising flat membranes and another members.

An apparatus and a method using a flat membrane are disclosed in, for example, Japanese Patent Laid-open No. 65179/1973. Namely, as shown in FIG. 13, a separation apparatus using a membrane, which is formed by providing a cylindrical case 61 having a fluid feed port 62 and a condensate discharge port 63 with a hollow rotary shaft 64 and a partition 65, and passing the hollow rotary shaft 64 through the center of a flat membrane leaf 69 both surfaces of which are covered with separation membranes 68, in such a manner that the interior of the membrane leaf (flat membrane support 67) and the hollow 70 of the rotary shaft communicate with each other via a small hole 66, and a separation method using a membrane, which consists of the step of turning the membrane leaf via the rotary shaft so as to produce a high speed gradient on the membrane surfaces are disclosed in Japanese Patent Laid-open No. 65179/1973.

Interposing a rotatable partition between stationary flat membrane leaves also prevents the reducing of a speed gradient caused by a corotation of a fluid to be treated, and an effect in increasing the shear rate of the membrane surfaces can be expected. For example, Japanese Patent Laid-open No. 74175/1974 discloses an apparatus in which the central holes of membrane leaves are sealed liquid-tightly, a membrane-permeated fluid being recovered at the outside of a case from the outer circumferential portions of the membrane leaves, partitions provided between membrane leaves being mounted firmly on a rotary shaft, which is passed in a non-contacting manner through the central holes of the membrane leaves, the partitions being turned so as to move the fluid in parallel with the membrane surfaces.

However, these apparatuses have the following drawbacks.

The shear rate of parallel, relatively moving flat surfaces increases in proportion to a reciprocal of the distance therebetween if the relative speeds are equal. Accordingly, this distance may be set as small as possible. However, there is the possibility that membrane leaves and partitions rotating at a high speed are displaced in their respective normal directions and contact each other. In order to prevent this inconvenience, it is necessary to form the membrane leaves and partitions with a high mechanical precision or set the clearance between the membrane leaves and partitions to a sufficient size.

Therefore, in a conventional membrane module, the equipment cost increases, or it is difficult to sufficiently increase the space efficiency (compactness), and, moreover, the rotational speed is necessarily set high in accordance with such a large distance between the membrane leaves and partitions for the purpose of obtaining a high shear rate of membrane surfaces.

A conventional rotary separation apparatus using flat membranes has advantages that it is unnecessary as mentioned above to supply a fluid to be treated, at a high flow rate. In the meantime, a fluid flow passage is lengthened as is clear from FIG. 13, since the fluid to be treated flows in series between all membrane leaves. Therefore, a pressure loss is far larger than that in a similar apparatus in which a fluid to be treated flows in parallel between the membrane leaves even if the feed rates in both cases are equal. Consequently, the feed pressure is necessarily increased so as to secure an effective filtration pressure, so that the required energy increases correspondingly.

A separation apparatus and a separation method which use membranes with a fluid to be treated flowing in parallel therebetween are also known. For example, Japanese Patent Publication No. 43181/1985 discloses a separation apparatus formed so that a fluid to be treated is supplied from a hollow rotary shaft onto each membrane, and a separation method using membranes which includes a step of supplying a fluid to be treated onto each membrane. This apparatus is not provided with a partition. The principle of this apparatus resides in the utilization of centrifugal force. Namely, making a fluid to be treated relatively in the cross-flow condition to the membrane surfaces by a centrifugal force, and permeate through the membranes is recovered at the outside of the case by a centrifugal force.

A separation apparatus formed for the purpose of minimizing the deterioration of the performance of membranes by frictionally washing the surfaces of membrane leaves and positively removing the solute and solid matter which have been accumulated on the membrane surfaces and do not permeate the membranes is disclosed in Japanese Utility Model Laid-open Nos. 151909/1987 and 11428/1991. Both of the apparatuses disclosed in these publications have frictional washing members disposed between membrane leaves, the apparatus in the former publication using a sponge like soft element as a frictional washing member, the apparatus in the latter publication using a brush as such a member.

SUMMARY OF THE INVENTION

The present inventors have supposed that the back permeation would be suitable for overcoming the defect of clogging of the separation membrane. After exntensive investigations on a process for integrating a separation membrane with a support in order to protect the separation membrane from deformation caused by back permeation, the inventors have found that this problem can be solved by combining the separation membrane with a flat membrane support having a specified multilayer structure. The present invention has been completed on the basis of this finding.

Namely, the present invention provides a flat separation membrane leaf characterized by consisting of a flat membrane support comprising an inner layer having a coarse structure having large voids and surface layers comprising a nonwoven fabric having a dense structure made of fine fibers and having small openings, said surface layers being partially adhered to the both sides of the inner layer with an adhesive or heat-fused so as to be integrated with the inner layer, and semipermeable membranes coating both sides of the support in such a manner that the polymer constituting the semipermeable membranes penetrates into the openings of the nonwoven fabrics of the surfaces of the support to combine the semipermeable membranes with the surfaces of the support.

The present invention provides also a flat separation membrane leaf characterized by consisting of a flat membrane support made of a nonwoven fabric and comprising an inner layer having a coarse structure having large voids and surface layers having a dense structure and small openings, wherein the density is gradually increased in the direction from the inner layer toward the surface layers, and semipermeable membranes coating both sides of the support in such a manner that the polymer constituting the semipermeable membranes penetrates into the openings of the nonwoven fabrics of the surfaces of the support to combine the semipermeable membranes with the surfaces of the support.

The present invention further provides a flat separation membrane element containing the above-described flat separation membrane leaf as the essential component.

The present inventors have obtained the knowledge that, if partitions, which are interposed between membrane leaves in a separation membrane element, which comprises of a plurality of regularly arranged membrane leaves, so as to increase the shear rate of the membrane surfaces efficiently, are formed so that the partitions are deformed so as not to contact the membrane leaves even when the membrane leaves rotating relatively are displaced in the direction of normal, and so that the partitions do not damage the membrane leaves, and vice versa even when they contact each other, it becomes unnecessary to produce a specially precise separation element in which the membrane leaves are not displaced in the direction of normal, and it becomes possible to solve the high-cost problem which is ascribed to the precision molding and machining operations.

The inventors have also obtained the knowledge that the attainment of production of such partitions renders it unnecessary to set large the clearance between the membrane leaves and partitions, so that the problems which occur in a method in which such a clearance is set large, and which the shear rate of membrane surfaces decreases in inverse proportion to the width of such a clearance in the same rotational speed of the separation element, and the efficiency of space decreases can also be prevented.

The inventors have further obtained the knowledge that, when the membrane leaf is formed out of a soft flexible material, the same effect can also be obtained, i.e., at least one of the membrane leaf and partition may have softness and flexibility. The inventors have earnestly made a study of separation membrane leaves and separation apparatus and method using the same on the basis of the above knowledge to complete the separation apparatus using flat membranes according to the present invention.

Namely, the present invention provides a rotary separation apparatus using flat membranes comprising flat separation membrane leaves, each of which is composed of a flat support and separation membranes attached to both surfaces thereof, and flat partitions, in which the membrane leaves and the partitions are arranged alternately at predetermined intervals and adapted to be rotated relatively to each other, characterized in that at least either the separation leaves or partitions have a flexibility.

Such a rotary separation apparatus using flat membranes of a preferable mode includes a rotary separation apparatus comprising of a separation membrane element having separation membrane leaves sealed liquid-tightly at their outer circumferential portions and arranged unitarily at predetermined intervals on a hollow tube which passes through these membrane leaves, wherein the hollow of the hollow tube and the inner layers of the separation membrane leaves communicate with each other with the joint portions thereof liquid-tightly sealed, and a structure provided with partitions as its structural elements and positioned on the outer side of the separation membrane element, the partitions being engaged with the structure so that the movement of the partitions in the rotational direction of a rotary shaft is restricted by the structure and so that the partitions can be displaced in the direction (direction of normal of the partitions or the axial direction of the rotary shaft) which is at right angles to the rotational direction of the rotary shaft, and, especially, a rotary separation apparatus using flat membranes in which the partitions are made of a soft flexible material and have projections extending substantially in the outer circumferential direction thereof which is opposite to the relative rotational direction of the partitions, and stress-break-up smoothly curved recesses at the root portions of these projections.

A rotary separation apparatus using the above-described separation membrane leaves according to the present invention is also preferable.

The present inventors thought that an advantageous method of minimizing a flow pressure loss when the feed and discharge rates of a fluid to be treated have been predetermined to a membrane separation apparatus. That is, to distribute the fluid to be treated, in such a manner that all of the flow passages between the membrane leaves and partitions extend in parallel with one another. The inventors made a study of a separation apparatus which is capable of introducing a fluid to be treated between the separation membrane leaves in parallel and positively without relying upon such a centrifugal force as is utilized in the apparatus disclosed in Japanese Patent Publication No. 43181/1985, and which has partitions, to attain the present invention.

Namely, the present invention provides a rotary separation apparatus using flat membranes, having flat separation membrane leaves each of which comprises or consists essentially of a flat support provided with a flow passage therein for a permeate and separation membranes on both surfaces of the support, which membrane leaves are sealed liquid-tightly at the outer circumferential portions thereof, and a hollow rotary shaft on which the membrane leaves are mounted at regular intervals so that the permeate flow passages in the separation membrane leaves and the hollow of the rotary shaft communicate with each other via a small hole in the wall of the rotary shaft with the joint portions of the membrane leaves and rotary shaft sealed liquid-tightly to form a separation membrane element, which is disposed rotatably in a case or container with flat non-rotatable flat partitions provided between the separation membrane leaves, characterized in that a feed flow passage and a discharge flow passage which are formed so that a fluid, e.g., a liquid to be treated can be supplied and discharged in parallel to and from the separation membrane leaves are provided in the case so as to extend in parallel with the hollow rotary shaft.

In such a separation apparatus using flat membranes, providing a feed flow passage and a discharge flow passage in symmetric and opposed positions with respect to the hollow rotary shaft, making the flat partitions of a flexible material and they can be displaced in the lengthwise direction of the rotary shaft, carrying out the prevention of corotation of the flat partitions by a fastening means provided in the feed flow passage and/or the discharge flow passage, and making at least either the separation membrane leaves or flat partitions of a flexible material constitute a preferable mode of the apparatus.

A rotary separation apparatus using flat membranes, provided with the above-mentioned separation membrane leaves according to the present invention is also a preferable mode of the present invention.

The present invention further provides a rotary separation apparatus using flat membranes, having a separation membrane element which comprises separation membrane leaves arranged in layers at predetermined intervals and combined together unitarily, each of which separation membrane leaves is composed of a flat support having a permeate flow passage therein and separation membranes attached to both surfaces of the support, which membrane leaves are sealed liquid-tightly at the outer circumferential portions thereof, and which has an outlet from which a permeate from these separation membrane leaves is discharged; and a flat partition element comprising of a plurality of flat partitions which are arranged in layers at predetermined intervals and combined together unitarily and independently of the separation membrane element, and which are disposed alternately with the separation membrane leaves in a mutually spaced manner, i.e., among the separation membrane leaves, a rotary shaft being passed through the central portion of either the separation membrane element or flat partition element, these elements being arranged rotatably with respect to each other, characterized in that fluid passing ports, e.g., liquid passing ports, are provided in the portions of at least either the separation membrane leaves or the partitions which are close to the rotary shaft thereof.

This separation apparatus using flat membranes, wherein a hollow shaft is passed through the separation membrane leaves in the separation membrane element, the permeate flow passage in the membrane leaves and the hollow of the hollow rotary shaft communicating with each other via small holes in the wall of the rotary shaft, the joint portions of the membrane leaves and rotary shaft being sealed liquid-tightly against the exterior thereof, the hollow of the hollow rotary shaft constituting an outlet from which the permeate is discharged; a similar apparatus wherein a rotary shaft is passed through the central portion of the separation membrane leaves, each of the separation membrane leaves being provided with a fluid passing port in the portion thereof which is close to the rotary shaft, each of the flat partitions being provided with a fluid passing port in the portion thereof which is close to the inner surface of the apparatus; a similar apparatus wherein the fluid passing ports provided in the portions of the membrane leaves which are close to the rotary shaft communicate with each other/substantially in parallel with the rotary shaft; a similar apparatus wherein at least either the separation membrane leaves or the flat partitions are made of a flexible material; and a similar apparatus wherein the separation membrane leaves in use consist of the above-described separation membrane leaves according to the present invention constitute preferable modes of the invention.

DETAILED DESCRIPTION OF THE INVENTION

A detailed description will now be made on the present invention.

The flat membrane support constituting the flexible, flat separation membrane leaf in the first embodiment of the present invention comprises an inner layer having a coarse structure having large voids and interposed between surface layers comprising a nonwoven fabric having a dense structure made of fine fibers and having small openings to form an integral structure. Therefore, the support essentially has a three-layered structure consisting of one inner layer and two surface layers. However, since it will suffice when the inner layer has a structure coarser than that of the surface layer, a multi-layered structure comprising layers laminated so that openings gradually increase with the thickness of the fibre diameter in the direction from the surface layer toward the inside may be employed in place of the above-described structure.

The support need not have layers of similar structures over the whole thickness thereof. Therefore, though the surface layers of the support are made of a nonwoven fabric, the inner layer of the support may also be made of a woven fabric having a high void volume, such as a tricot or pile fabric, or a mesh screen beside a nonwoven fabric having a coarse structure made of thick fibers and having large openings. Further it may be a net-shaped molding prepared by the melt extrusion of a thermoplastic polymer into filaments.

When the woven fabric is used for forming the inner layer, it is preferably made of monofilaments having a large diameter. The inner layer is preferably after-treated with a resin so as to keep the structure with the low level of the water-flow resistance against the pressure applied to the membrane surface. The after-treatment with a resin can be conducted by, for example, immersing the woven fabric in a solution of the polymer or its precursor, draining it to remove superfluous solution, drying it and subjecting it to polycondensation and/or crosslinking reaction to form a thin coating film of the polymer thereon. Examples of the coating polymers include polyvinyl alcohol, polyacrylates, melamine resin and modified urea resins.

The flat membrane support constituting the flat separation membrane leaf in the first embodiment of the present invention comprises the above-described inner layer integrated with the surface layers. When the support has a laminated multi-layered structure, the integration may be conducted by heat treatment through heating rolls or by joining the layers with each other by an adhesive or the like at many joints located at such intervals that no inflation is caused by the back pressure. The spaces between the joints serve as the passages for the permeated liquid or concentrated gas.

Examples of the material of the fiber constituting the flat membrane support in the first embodiment of the present invention include heat-fusible materials such as polyesters, polyamides and polyolefins. Even those materials which per se are difficultly heat-fused can be fused by using a hot-melt binder.

When the inner layer of the flat membrane support in the first embodiment of the present invention is a mesh screen, it is made of, for example, polyethylene, polypropylene or polyethylene terephthalate. When the inner layer is a net-shaped molding produced by the melt-extrusion of a thermoplastic polymer into filaments, the material thereof is, for example, polyethylene or polypropylene.

The adhesives usable therefor include polyurethane adhesive, epoxy adhesive, etc.

When a polyester fiber is used as the material of the nonwoven fabric in the flat membrane support in the first embodiment of the present invention, the fiber for the surface layer preferably has a thickness of 1 to 5 denier and a length of 10 to 50 mm and that for the inner layer preferably has a thickness of 5 to 50 denier and a length of 30 to 100 mm. By strongly crimping the fiber to be used for forming the inner layer, both the void volume and pressure resistance can be simultaneously improved.

When the flat membrane support in the present invention is made of a nonwoven fabric, the surface layer of the support preferably has a thickness of about 0.05 to 0.2 mm, a basis weight of about 0.5 to 1.0 g/ml and a gas permeability of about 30 to 300 m$^3$/m$^2$·sec and the inner layer thereof preferably has a thickness of about 0.5 to 2.0 mm, a basis weight of about 0.2 to 0.5 g/ml and an air permeability of about $2 \times 10^3$ to $2 \times 10^4$ m$^3$/m$^2$·sec (in terms of that of a layer having a thickness of 0.1 mm).

When the inner layer is made of a woven fabric, it is preferably one similar to the nonwoven fabric. When the inner layer is made of the mesh screen or net-shaped molding, it is preferably one having an opening of about 0.5 to 3.0 mm and a filament diameter of about 0.25 to 1.0 mm.

The flat membrane support constituting the flexible, flat separation membrane leaf in the second embodiment of the present invention is made of a nonwoven fabric. The inner layer has a coarse structure having large voids and the surface layers have a dense structure having small openings, wherein the density gradually increases in the direction from the inner layer toward the surface layer.

The fiber material constituting the flat membrane support in the second embodiment of the present invention may be the same as that for the flat membrane support in the first embodiment of the present invention. The density (coarseness) of the inner layer and the density of the surface layer may also be similar to those of the flat membrane support comprising the inner layer and surface layers made of a nonwoven fabric in the first embodiment of the present invention.

The flat separation membrane leaf of the present invention has semipermeable membranes on the both sides of the above-described flat membrane support.

The semipermeable membrane is bound to the nonwoven fabric constituting the surface layer of the flat membrane support by the anchoring effect obtained since a portion thereof penetrates into the voids in the fabric.

Examples of the material of the semipermeable membrane include polyethersulfones, polysulfones, polyacrylonitriles, polyamides, polyimides and cellulose esters.

The two semipermeable membranes which coat both sides of the flat membrane support may be either symmetric or asymmetric. Alternatively they may be composite membranes. Preferred examples of the semipermeable membrane include asymmetric membranes formed by the phase inversion method and composite membranes comprising an asymmetric membrane as a support layer formed by the phase inversion method.

Processes for producing the flat separation membrane leaf of the present invention are not limited. Preferred examples thereof will now be described.

First process comprises preparing the above-described inner layer and surface layers, integrating them by adhesion with an adhesive or by heat fusion through heating rolls to form the flat membrane support in the first embodiment of the present invention or, alternatively, to form the flat membrane support in the second embodiment of the present invention, casting a solution of the membrane-forming polymer on the surfaces of the membrane support and immersing the support in a suspended solidifying bath to form the semipermeable membrane parts by the so-called phase inversion method. The permselective membranes can be bonded to the support by the anchoring effect wherein the membrane-forming polymer solution penetrated into the nonwoven fabric constituting the surface layer of the support is arrested by the fibers after the gelation. The penetration depth can be suitably varied depending on the viscosity of the polymer solution, surface tension, affinity for the fiber (wettability of the fiber with the solution), size of the opening of the nonwoven fabric, pressure applied to the polymer solution in the casting step and time required for the gelation after the casting.

Examples of the solvent used for preparing a solution of the membrane-forming polymer include dimethyl sulfoxide, N-methyl-2-pyrrolidone, N,N-dimethylformamide and 1,4-dioxane. The membrane-forming polymer solution can be cast over the membrane support surface by passing the flat membrane support through two coating rolls.

Second process comprises first forming the semipermeable membrane on one side of the nonwoven fabric constituting the surface layer of the membrane support by the above-described phase inversion method to obtain the nonwoven fabric coated with the semipermeable membrane, bonding it to each side of the inner layer(s) of the membrane support so that the semipermeable membrane is positioned outside by, for example, adhesion with the adhesive at many joints in the same manner as that described above to form an integrated product.

Thus the flat separation membrane leaf having the semipermeable membrane is produced, which is preferably used as ultrafiltration membrane, microfiltration membrane, reverse osmosis membrane, gas separation membrane, pervaporation membrane, vapor permeation membrane or penetration/extraction membrane.

The flat separation membrane element of the present invention contains the above-described flat separation membrane leaf as the essential component. Other components of the element are not limited so far as the element contains the flat separation membrane leaf as the essential component.

The process for producing the flat separation membrane element is not particularly limited. For example, it can be produced by cutting the flat separation membrane leaf of the present invention into a piece of a desired shape, such as a round or square plate, sealing the periphery of the piece by heat fusion or by the application of an adhesive, providing a hole at the center of the plate, inserting a hollow tube having communicating ports through which liquid or gaseous permeate can flow in or out into the center of at least one such plate, and sealing the fitting part and the periphery of the separation membrane leaf liquid-tight or air-tight by heat fusion or by the application of an adhesive. The flat separation membrane element may be placed in a suitable case to form a separation membrane module or, alternatively, it may be immersed as it is without using any case in a liquid to be treated.

As described above, the flat separation membrane leaf of the present invention is not substantially deformed even when a fluid is forced to permeate the membrane in the direction opposite to the direction of the permeation in the step of separating an ingredient by the membrane. Further, since the integrated membrane is used, the membrane is free from wrinkles which cause breakage. Therefore, it can be cleaned by back permeation which is an effective means for recovering the performance of the membrane which was reduced by the solutes or suspended solids in the liquid to be treated or by dusts in the gas to be treated. The separation membrane leaf of the present invention can be cleaned by back permeation without impairing its essential permeation flow rate.

The rotary separation apparatus using flat membranes according to the present invention will now be described in detail.

In the first rotary separation apparatus using flat membranes according to the present invention, flat separation membrane leaves each of which comprises a flat support and separation membranes attached to both surfaces thereof, and flat partitions are arranged in layers alternately in a mutually spaced manner so that the membrane leaves and partitions are adapted to be rotated relatively to each other, and the characteristics of this apparatus reside in that at least either the separation membrane leaves or the partitions have a flexibility.

When flexible partitions are used in the present invention, they preferably comprises light and flexible films or sheets having, as a main component, polyolefins including polyethylene and polypropylene; vinyl polymers including polyvinyl chloride, polyvinylidene chloride, polytetrafluoroethylene and polyvinylidene fluoride; polycondensates including polyamide, polyimide and polyester; and various kinds of organic high molecular compounds, such as cellulose ester, but the main components are not limited to these materials.

Various rubber sheets can also be used preferably as flexible partitions just as the sheets of the above-mentioned materials. However, a rubber sheet the Young's modulus of which is too low has to be formed to a large thickness so as to resist high sheering stress. In such a case, the maps of the sheet becomes large correspondingly, and the compliance (displacement following characteristics) in the normal direction of the sheet would be spoiled. Therefore, a thin film, such as a film of oriented polyester having a high Young's modulus is used preferably in some cases.

When flexible partitions are used, they are retained preferably by providing the whole surfaces thereof, at which the partitions are layered on the membrane leaves, with high compliance (displacement following characteristics) in the normal direction thereof, i.e., in the vertical direction of the separation apparatus using flat membranes.

Figure 2:
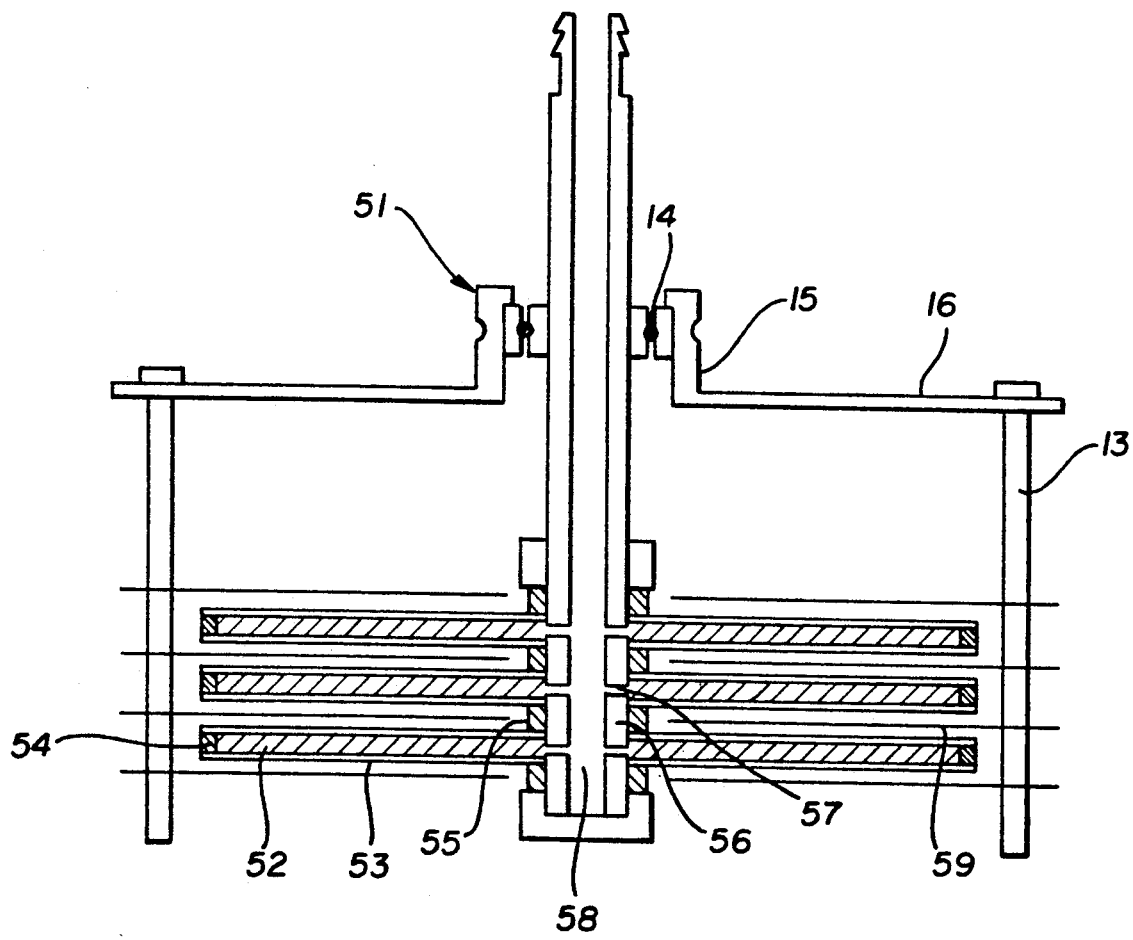
FIG. 2 is a sectioned side elevation of an embodiment of the apparatus according to the present invention.

An example of the separation apparatus using flat membranes, in which the partitions have high compliance in the normal direction thereof and are formed rotatably is shown in FIG. 2.

In the separation apparatus using flat membranes 51 shown in FIG. 2, membrane leaves 54 are arranged in layers at regular intervals via annular spacers 55, and the membrane leaves 54 are fitted to a hollow tube 56 at the central holes thereof, a separation membrane element thus formed being used in this apparatus 51.

The permeated liquid flow passage in the membrane leaves 54 communicate with a hollow 58 of the hollow tube 56 via a small hole 57 made in the wall of the hollow tube 56, and clearances between the membrane leaves 54 and the joint portions of the outer surface of the hollow tube 56 are sealed liquid-tightly with the spacers 55.

Each partition has holes at which it is engaged with an outer frame (structure) 13 which is rotatable relatively to the membrane leaves 54. The partition 59 is shaped so that a movement thereof in the rotational direction is restricted by the outer frame 13 with the displacement thereof in the normal direction (lengthwise direction of the hollow tube 56) not restricted thereby.

The outer frame 13 is supported on a bearing 14, an outer cylinder 15 and a support plate 16. In this separation apparatus using flat membranes 51, the hollow tube 56 combined unitarily with the membrane leaves is fixed (fixing means is not shown), and the outer frame 13 combined unitarily with the partitions is adapted to be rotated by external power (not shown).

Namely, the rotary separation apparatus using flat membranes shown in FIG. 2 comprises a separation membrane element having separation membrane leaves sealed liquid-tightly at their outer circumferential portions and arranged in layers and unitarily at predetermined intervals on a hollow tube which passes through these membrane leaves, wherein the hollow of the hollow tube and the inner layers of the separation membrane leaves communicate with each other with the joint portions thereof liquid-tightly sealed, and a structure provided with partitions as its structural elements which are positioned on the outer side of the separation membrane element, the partitions being engaged with the structure so that the movement of the partitions in the rotational direction is restricted by the structure and so that the partitions can be displaced in the direction which is at right angles to the rotational direction (normal direction of the partitions or the axial direction) of the structure.

In such a separation apparatus using flat membranes, partitions comprising a soft flexible material and having projections extending substantially in the outer circumferential direction thereof and of which extending direction is opposite to the relative rotational direction of the partitions, and stress-break-up smoothly-curved recesses at the root portions of these projections may be used. Such partitions are flat partitions, the outer diameter (Dm) of which is equal to that of the membrane leaves, shown in, for example, FIG. 3, these partitions having a projection 11 and a stress-break-up hole 60, the projection having holes 12 for engaging with the outer frame.

A separation apparatus using flat membranes, having a separation membrane element comprising or consisting essentially of flat membrane leaves with a hollow tube, i.e., a hollow rotary shaft, which serves also as a permeate collecting tube, passing through the central portions of the membrane leaves in the normal direction thereof so as to combine them unitarily and set the membrane element rotatable by the rotation of the hollow rotary shaft, and a structure having partitions as structural elements, these partitions being non-rotatable are also included in the present invention.

A method employed in such a separation apparatus using flat membranes of retaining the partitions is to fix (retain) the partitions by engaging the same at their outer circumferential portions with, for example, the case or support. If the diameter of the partitions cannot be set sufficiently larger than that of the membrane leaves when this method is employed, the method should be studied more elaborately. If, for example, a method of fixing the partitions at the whole of the outer circumferential portions thereof is employed instead of using an elaborated fixing method, the compliance (displacement following characteristics) in the normal direction of the portions of the partitions which are close to the outer circumferences thereof is greatly limited.

In order to minimize this limitation due to the fixing of the outer circumferential portions of the partitions, it is desirable that the fixed portions of the partitions be separated sufficiently from the portions thereof corresponding to the outer circumferential portions of the membrane leaves. In order to maintain the efficiency of space at a high level in a separation apparatus using flat membranes which has a cylindrical case, it is necessary that a clearance between the outer circumferential surfaces of the membrane leaves and the inner circumferential surface of the case be set as small as possible, and, in such a case, the fixed portions of the partitions do not become sufficiently far from their projected outer circumferential portions of the membrane leaves in the radial direction.

Figure 4:
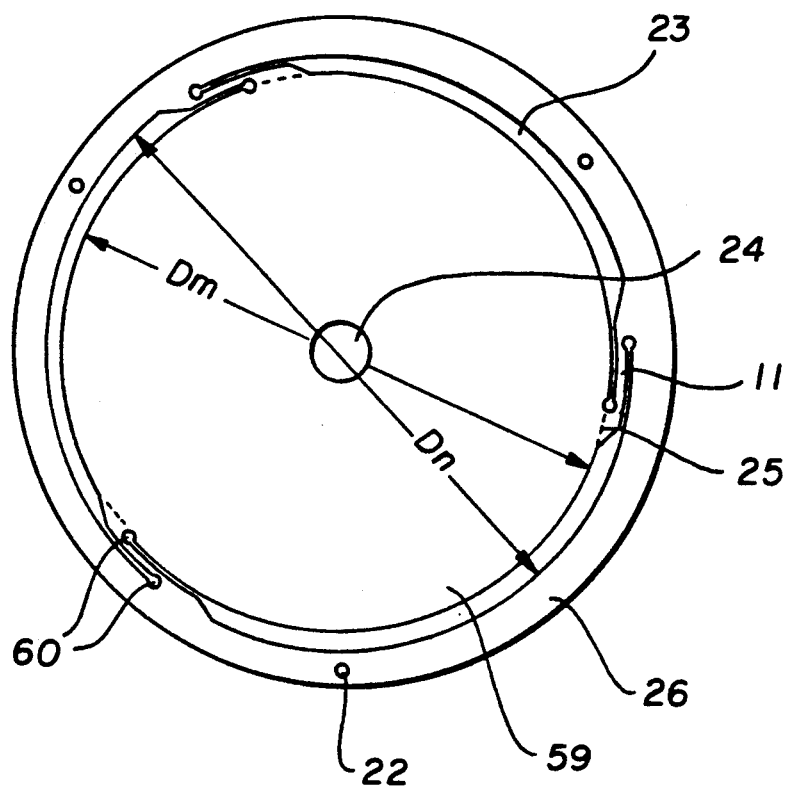
FIG. 4 is a plan view of another type of flexible partition used in the present invention.

However, this problem can be solved by providing, for example, as shown in FIG. 4, a partition 59 having stress-break-up holes 60, which consists of a recess defined by a smoothly curved edge, positioning pin holes 22, arcuate recesses 23 corresponding to a difference between the inner diameter Dn of the cylindrical case and the outer diameter Dm of the membrane leaves, and a through hole 24 the diameter of which is larger than the outer diameter of the hollow tube; that is, a partition 59 having a plurality of projections 11 at the portion 25 thereof which is corresponding to the outer circumferences of the membrane leaves (which portions 25 are in the same positions as the outer peripheries of the membrane leaves), extending portions which are extended these projections 11 in the circumferential direction opposite to the rotational direction of the membrane leaves to such an extent that satisfies the above-mentioned conditions and incorporated portions 26 on the outer side thereof; and fixing the incorporated portions 26 at the outer circumferential sections of these partitions to the layered cylindrical case.

A distance between the portions 25 of the partitions 59 which correspond to the outer circumferences of the membrane leaves and the positions in which the free end portions of the projections 11 are fixed may be at least three times as long as the width of the clearance between adjacent membrane leaf and partition, and preferably not less than sixteen times as long as this width.

When flexible partitions are used in the separation apparatus 51 (FIG. 2) using flat membranes according to the present invention, membrane leaves having no flexibility may also be employed. A support for such non-flexible membrane leaves include a flat molded body comprising a hard plastic, such as a vinyl polymer, for example, polymethylmethacylate and polystyrene; and a condensed polymer, for example, polyamide, polyimide, polyester, polycarbonate, polysulfone and polyethersulfone, and having a permeated liquid flow passage on the outer surface or in an inner layer thereof, or a flat body formed by laminating a porous sheet, such as a screen mesh or a nonwoven cloth on such a flat molded body, or a woven cloth, a nonwoven cloth or paper which are hardened by being treated with a resin, or a sintered body of pulverized bodies of a plastic or a metal.

Conversely, when flexible membrane leaves formed so as to have high compliance (displacement following characteristics) in the normal direction thereof are used, the partitions in use may not necessarily be flexible. In such a case, elaborating a partition retaining method is not required.

A flexible membrane leaf can be produced in practice by using as a support therefor, for example, screen mesh, a resin-treated woven cloth of tricot and a nonwoven cloth; or a foam sheet of polyurethane or polyamide when a differential pressure of diaphragm of as low as not more than 0.3 Kg/cm$^2$. The separation membrane leaves of the first and second embodiments of the present invention can be shown as concrete examples of the flexible membrane leaves.

Forming partitions and/or membrane leaves flexibly and providing them with high compliance (displacement following characteristics) in the normal direction thereof bring about preferable effects on the performance of the membranes in addition to the above-mentioned effects. When the membrane leaves are rotated, the partitions and/or membrane leaves are vibrated in the normal direction, the concentration polarization reducing effect due to the normal agitation force is produced in addition to the concentration polarization reducing effect due to the high shear rate on the membrane surfaces. Furthermore, even when extraneous matter and suspended component which are liable to cause the flow passages to be blocked flow into a fluid to be treated, the flow passages are deformed easily, so that such materials easily flow therethrough, so that the blocking of the passages rarely occurs.

The above is a description of separation apparatuses using flat membranes, which have a separation membrane element formed by passing a shaft through membrane leaves.

In view of the fact that a high sheer rate of the membrane surfaces occurs due to the relative movement of the membrane leaves and partitions, the above-described various effects can be obtained substantially in the same manner in these rotary separation apparatus using flat membranes even when the shaft with which the partitions instead of membrane leaves are combined unitarily is rotated.

Figure 5:
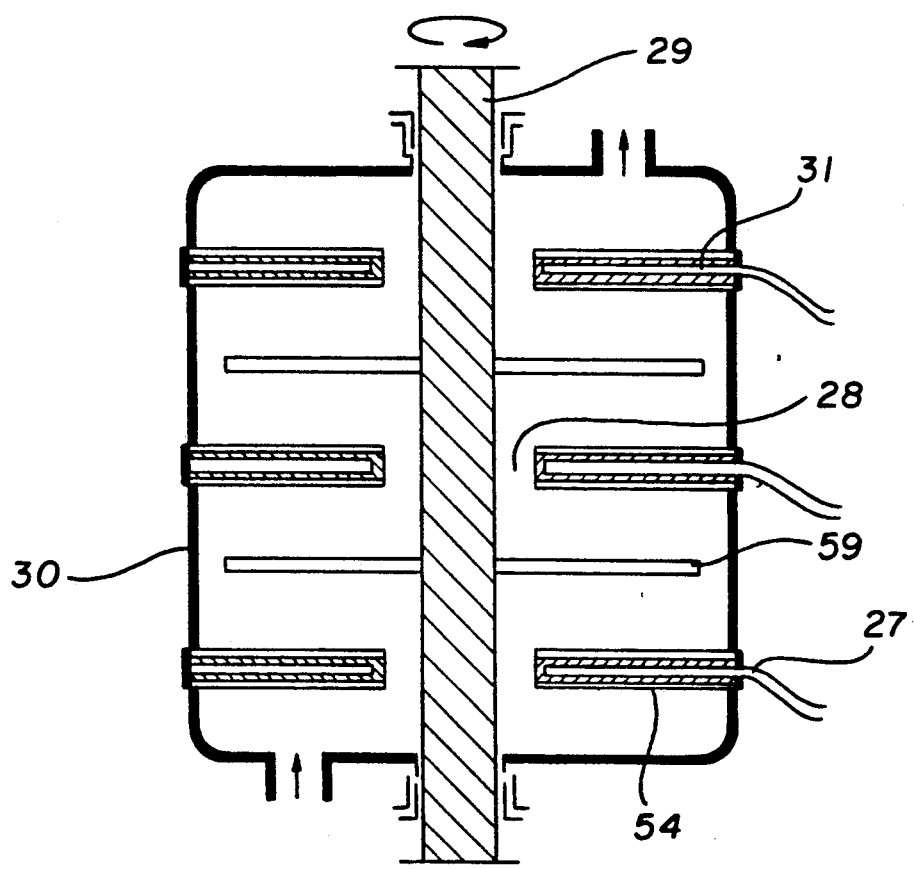
FIG. 5 is a sectioned side elevation of another type of apparatus according to the present invention.

In order to use a structure in which membrane leaves 54 are fixed to the inner surface of a case as shown in, for example, FIG. 5, the structure may be formed by providing the portion of the cylindrical case 30 to which the membrane leaves are fixed with a permeate discharge port 27 communicating with the inner layers 31 of the membrane leaves, sealing the joint portions thereof liquid-tightly, providing the membrane leaves 54 with a central hole 28, sealing the end portions of the central hole 28 liquid-tightly so as to form free ends, and passing a rotary shaft 29, on which partitions 59 are mounted fixedly, through the central hole 28 of the membrane leaves so as not to contact the membrane leaves 54 so that the partitions 59 can be rotated.

According to the present invention, flat membrane leaves and partitions are arranged in layers alternately at predetermined intervals to form an apparatus using flat membranes in which the membrane leaves and partitions can be rotated relatively to each other. Since the membrane leaves and/or partitions are formed flexibly with the partitions preferably formed so that they can be displaced freely in the normal direction, it is unnecessary that the structural parts of the apparatus be arranged with a high precision as compared with those of an apparatus in which both the membrane leaves and partitions consist of a hard material. This enables a separation apparatus using flat membranes to be manufactured at a low cost.

According to the present invention, the membrane leaves and/or partitions have a small thickness and can be arranged at minimized intervals, so that a compact rotary separation apparatus using flat membranes can be provided. Since the shear rate of the membrane surfaces can be maintained high with the number of revolutions per unit time of the membrane leaves unchanged, a separation apparatus having an increased permeation flux can be provided. Since the liquid agitating effect owing to the flexible material used for the membrane leaves and/or partitions is obtained additionally, a separation apparatus having a further increased permeation flux can be provided.

Second and third rotary separation apparatuses using flat membranes according to the present invention will now be described in detail.

The second rotary separation apparatus using flat membranes according to the present invention has flat separation membrane leaves each of which comprises a flat support provided with a flow passage therein for a permeate and separation membranes on both surfaces of the support, which membrane leaves are sealed liquid-tightly at the outer circumferential portions thereof, and a hollow rotary shaft on which the membrane leaves are mounted at regular intervals so that the permeate flow passages in the separation membrane leaves and the hollow of the rotary shaft communicate with each other via small holes in the wall of the rotary shaft with the joint portions of the membrane leaves and rotary shaft sealed liquid-tightly to form a separation membrane element, which is disposed rotatably in a case with flat non-rotatable partitions provided between the separation membrane leaves, and is characterized in that a feed flow passage and a discharge flow passage which are formed so that a fluid to be treated can be supplied and discharged in parallel to and from the separation membrane leaves are provided in the case in parallel with the hollow rotary shaft.

Owing to such construction, a fluid to be treated is carried to all the membrane leaves with a substantially negligible low pressure loss through the feed flow passage having a sufficiently large cross-sectional area, and the treated fluid in each membrane leaf is discharged with a substantially negligible extremely low pressure loss through the discharge flow passage having a sufficiently large cross-sectional area.

A branch flow, which advances through a clearance between the membrane leaves and the inner surface of the container and not along the membrane surfaces, of the fluid to be treated supplied to each membrane leaf constitutes a loss of energy, so that such a branch flow has to be eliminated as much as possible. In order to meet the requirement, it is necessary to minimize the clearance between the membrane leaves and the inner surface of the case. In order to minimize this clearance, it is preferable to make the membrane leaves circular and set the cross-sectional shape of the case circular. The circumferential movement of the partitions in accordance with the rotation of the membrane leaves causes the turbulence of the fluid to be treated to lower but providing a means for preventing such a corotation of the partitions on the inner side of the inner surface of the case is not desirable in view of the problem of energy loss mentioned above. If a case formed by combining annular bodies is used, the partitions can be held between the annular bodies, and the rotary movement thereof can be prevented. However, this method causes the manufacturing cost to increase. When the case is formed cylindrically, an anti-rotation means for the partitions is provided in the feed flow passage and/or the discharge flow passage which is formed as a groove extending substantially in parallel with the rotary shaft and on the outer side of the outer circumferences of the flat membrane leaves, and projections on the portions of the flat partitions which correspond to the feed flow passage and/or the discharge flow passage, these projections being fastened to the rotation preventing means, whereby it becomes possible to prevent the rotary movement of the partitions and minimize the clearance between the membrane leaves and partitions and the inner surface of the case.

The means for preventing the rotary movement of the partitions, which is provided in the feed flow passage and/or the discharge flow passage can be formed by placing, for example, a rod type member in the flow passage in parallel therewith, forming projections which have smoothly curved holes on the partitions, and passing the rod type member through the projections. The distance between the partitions and that between the partitions and membrane leaves can be regulated and retained by inserting spacers thereamong.

Figure 6:
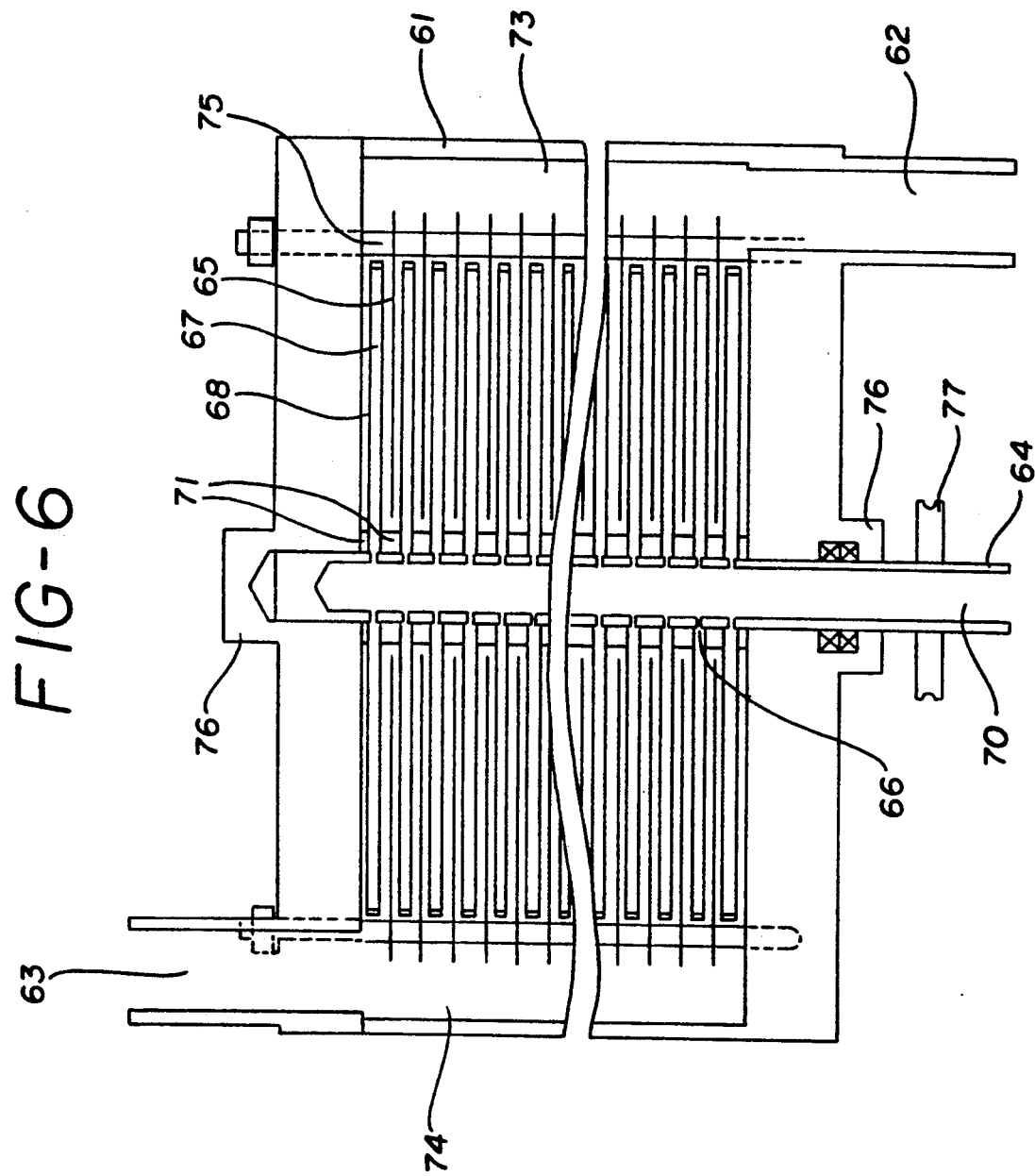
FIG. 6 is a sectioned side elevation of another embodiment of the apparatus according to the present invention.
Figure 7:
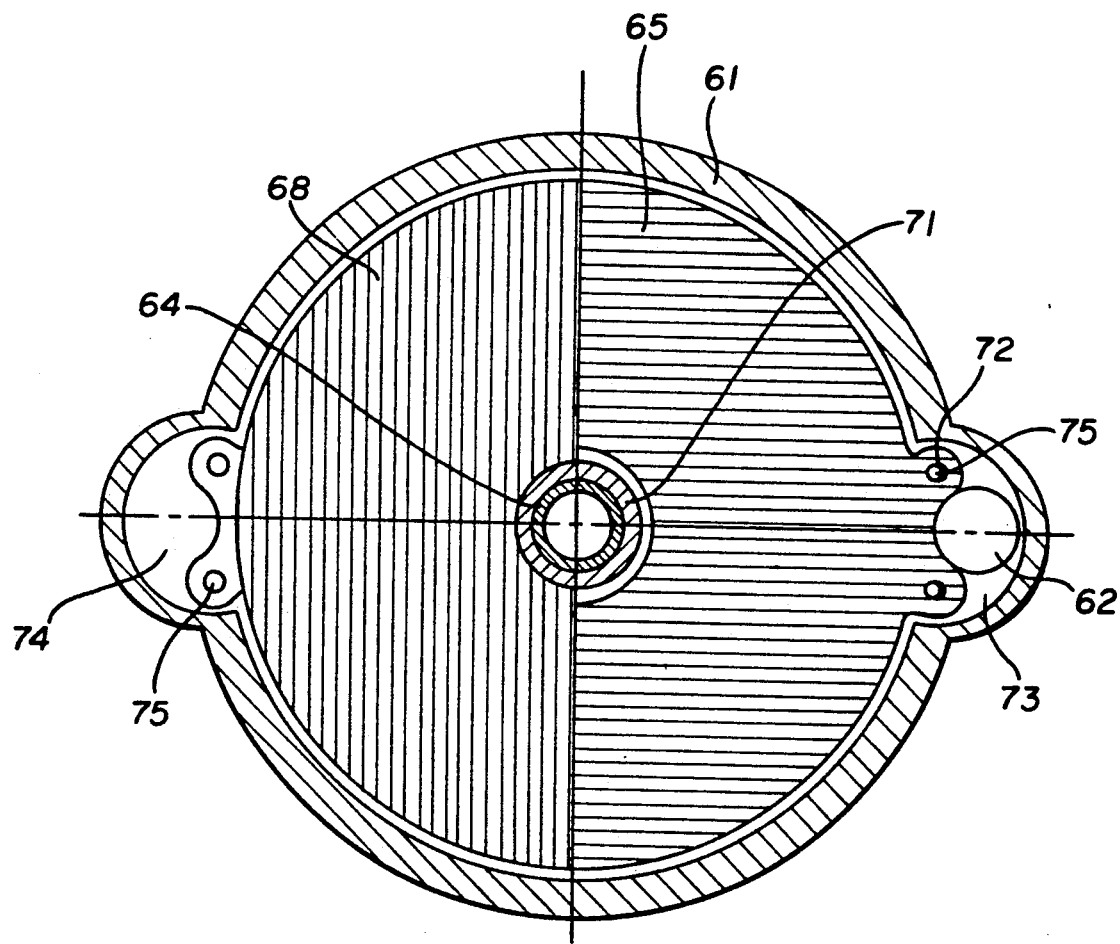
FIG. 7 is a horizontal section of the apparatus shown in FIG. 6 according to the present invention.

A longitudinal section of an embodiment of the rotary separation apparatus using flat membranes according to the present invention is shown in FIG. 6. A horizontal section of the same apparatus is shown in FIG. 7. Referring to FIG. 7, a left half portion (hatched with vertical lines) thereof shows a surface of a membrane leaf, and a right half portion (hatched with lateral lines) a surface of a partition.

Referring to FIG. 6, flat separation membrane leaves 69 in each of which separation membranes 68 are laminated on both surfaces of a flat support 67 with the outer circumferential portions thereof joined together with an adhesive and sealed are arranged in layers at regular intervals via spacers 71 and fitted firmly over a hollow rotary shaft 64. The flat support 67 is provided in its both surfaces with radially extending grooves, and a permeate flow passage formed between the support and separation membranes 68 lined with a nonwoven cloth communicates with a hollow 70 of the rotary shaft 64 via small holes 66 provided in the same shaft. A membrane element comprising membrane leaves and hollow rotary shaft 64 is sealed liquid-tightly with annular spacers 71. Between adjacent membrane leaves, a double lug-carrying annular partition 65 formed by punching a flexible film sheet and shown in FIG. 7 (right half portion) is inserted in advance. When the membrane element is set in the cylindrical case 61, the holes 72 in the partitions 65 are fitted over a rotation-preventing rod 75 provided in a feed flow passage 73 and/or a discharge flow passage 74 which is formed as a groove in parallel with the axis of the inner surface of the container and in a position symmetric with the rotary shaft 64. Consequently, the partitions 65 are positioned among the membrane leaves so that the partitions 65 do not turn but can be displaced axially (in the lengthwise direction of the rotary shaft).

A fluid to be treated flows from a fluid feed port 62 provided at one end portion of the cylindrical case 61 into the feed flow passage 73 with substantially no pressure loss, and advances among the rotating membrane leaves and non-rotating partitions 65, a permeate through the membrane being then lost, the remainder of the treated fluid reaching the discharge flow passage 74 to flow out from a condensate discharge port 63.

The hollow rotary shaft 64 is supported on a bearing 76, and adapted to be rotated by a motor via a pulley 77 and a driving belt (not shown).

In the embodiment shown in FIGS. 6 and 7, the feed flow passage and discharge flow passage are provided symmetrically with respect to the hollow rotary shaft 64 and in a mutually opposed state, and the flat partitions 65 are flexible and capable of being displaced in the lengthwise direction of the rotary shaft. In addition, the preventing of the flat partitions 65 from being turned with the membrane leaves is done by a fastening means provided in the feed flow passage 73 and/or the discharge flow passage 74.

In this embodiment, the fitting of membrane leaves over the hollow rotary shaft 64 is done by using an annular spacer 71, and, besides the spacer, an elastic O-ring can also be used. An adhesive may also be used.

In this embodiment, the partitions 65 can be displaced freely in the axial direction. If spacers are inserted additionally among the partitions, the axial position of the partitions can be fixed with respect to the position of the rotation-preventing rod 75.

The partitions 65 may not have a flexibility. The partitions 65 in this embodiment is made circular and concentric with a cross section of the rotary shaft 64 and has a central hole the diameter of which is larger than the outer diameter of the same shaft 64, as well as locking projections on the outer circumferential portions thereof. The shape of the partitions is not limited to a circular shape; they may have, for example, a polygonal shape drawn by connecting the ends of the projections by curves or straight lines.

In the structure (separation membrane element) comprising of the membrane leaves and hollow rotary shaft 64, more than 100 membrane leaves are generally layered, and the length of the membrane element of 1-3 m is suitable and practical.

A membrane leaf used in the second rotary separation apparatus using flat membranes according to the present invention may comprise a flat molded body which is composed of a plastic, for example, polyolefins including polyethylene and polypropylene, vinyl polymers including polyvinyl chloride, polymethyl methacrylate and polystyrene, and condensed polymers including polyamide, polyimide, polyester, polycarbonate, polysulfone and polyester sulfone, and which is provided with a permeate flow passage in the outer surface or inner layer thereof; or a combination of flat molded body composed of these materials, and a porous sheet, such as screen mesh or a nonwoven cloth laminated on the molded body; a sintered plate of plastic pulverized bodies or metallic pulverized bodies, or a combination of a pressure resisting, flow passage-carrying flat membrane support composed of sclean mesh, a resin-treated woven cloth, a woven cloth of bristles and a nonwoven cloth, and a flat separation membrane having a selective permeation function, composed of an ultrafiltration or microfiltration membrane of polyacrylonitrile, polysulfone, polyamide and polyolefin, or a reverse osmosis membrane of cellulose acetate and crosslinked polyamide and the like laminated on both surfaces of the membrane support, and sealed at the outer circumferential portion of the combination with an adhesive of polyurethane or epoxy resin.

Using the separation membrane leaves in the first and second embodiments of the present invention is specially preferable.

Flexible separation membrane leaves which employ, for example, screen mesh, a woven cloth of resin treated tricot and a nonwoven cloth as a membrane leaf support, or which employ a foam sheet of polyurethane or polyamide for the same purpose when a differential pressure of diaphragm is as low as 0.3 $Kg/cm^2$ can also be used.

The partition used in the second separation apparatus using flat membranes according to the present invention may comprise a film or sheet having, as a main component, polyolefins including polyethylene and polypropylene; vinyl polymers including polyvinyl chloride, polyvinylidene chloride, polytetrafluoroethylene and polyvinylidene fluoride; polycondensates including polyamide, polyimide and polyester; and organic high molecular compounds including cellulose ester, but the main component is not limited to these materials.

According to the present invention, it is preferable that at least either the separation membrane leaves or the flat partitions, especially, the partitions have a flexibility. The partitions preferably have small weight.

The second separation apparatus using flat membranes according to the present invention is constructed so that a fluid to be treated is parallel-supplied and discharged, whereby a fluid pressure loss can be reduced greatly. This effect increases substantially in proportion to a square of the number of the membrane leaves.

A comparison between the second apparatus according to the present invention and a conventional apparatus in which a fluid to be treated is series-supplied and discharged which are operated by using the same number of membrane leaves with a fluid to be treated supplied at the same flow rate clearly shows the following. Since, in the apparatus according to the present invention, a fluid is supplied in parallel flows in a branching state to the membrane leaves, the feed rate per membrane leaf decreases as compared with that in a conventional apparatus in which the whole quantity of supplied fluid flows to every membrane leaf, whereby a pressure loss reducing effect substantially proportional to the number of the membrane leaves is obtained. Although the length of the flow passage in the conventional apparatus is equal to a product of the length of a membrane leaf and the number of layers of membrane leaf in use, that of the flow passage in the apparatus according to the present invention is equal to the length of one membrane leaf, so that the above-mentioned pressure loss reducing effect further increases. A pressure loss reducing effect owing to extremely few bent flow passages is also obtained in the present invention.

When the partitions are fastened in the feed and discharge flow passages in the apparatus according to the present invention, the clearance between the membrane leaves and the inner surface of the container decreases, so that the case can be made compact. When the partitions and/or the membrane leaves are formed flexibly, even a flow passage temporarily blocked by extraneous matter is expanded since the membrane leaves and/or the partitions are temporarily bent in such a case. Consequently, the material (extraneous) blocking the flow passage can flow therethrough, so that an effect in preventing the blocking of a flow passage can also be expected.

The present invention further provides a rotary separation apparatus using flat membranes, i.e., the theird rotary separation apparatus, having a separation membrane element which comprises separation membrane leaves arranged in layers at predetermined intervals and combined together unitarily, each of which separation membrane leaves is composed of a flat support having a permeate flow passage therein and separation membranes attached to both surfaces of the support, which membrane leaves are sealed liquid-tightly at the outer circumferential portions thereof, and which has an outlet from which a permeate from these separation membrane leaves is discharged; and a flat partition element comprising a plurality of flat partitions which are arranged in layers at predetermined intervals and combined together unitarily and independently of the separation membrane element, and which are disposed alternately with the separation membrane leaves in a mutually spaced manner, i.e., among the separation membrane leaves, either the separation membrane element or the flat partition element having a rotary shaft which is passed through the separation membrane leaves or the partitions at the central portion thereof, these elements being arranged rotatably with respect to each other, characterized in that fluid passing ports are provided in the portions of at least either the separation membrane leaves or the partitions which are close to the rotary shaft thereof.

The present invention also provides an apparatus, wherein a hollow shaft is passed through the separation membrane leaves in the separation membrane element, the permeate flow passage in the membrane leaves and the hollow of the hollow rotary shaft communicating with each other via small holes in the wall of the rotary shaft, the joint portions of the membrane leaves and rotary shaft being sealed liquid-tightly against the exterior thereof, the hollow of the hollow rotary shaft constituting an outlet from which the permeate is discharged.

In other words, the present invention also relates to a rotary separation apparatus using flat membranes, having a separation membrane leaf element which comprises separation membrane leaves arranged in layers at predetermined intervals and combined unitarily, each of which separation membrane leaves is composed of a flat support having a permeate flow passage therein and separation membranes attached to both surfaces of the support, which membrane leaves are sealed liquid-tightly at the outer circumferential portions thereof, and which has an outlet from which a permeate from these separation membrane leaves is discharged, and a flat partition element comprising a plurality of partitions which are arranged in layers at predetermined intervals and combined unitarily and independently of the separation membrane element, and which are disposed alternately with the separation membrane leaves in a mutually spaced manner, i.e., among the separation membrane leaves, a rotary shaft being passed through the central portion of either the separation membrane element or the flat partition element, these elements being arrange rotatably with respect to each other, the rotary shaft being formed as a hollow shaft, into which a permeate flows out, in the case where the rotary shaft is passed through the membrane leaves, the permeate flow passage in the membrane leaves and the hollow of the hollow shaft communicating with each other via small holes in the wall of the same shaft, these fluid flow passages being sealed liquid-tightly against the exterior thereof, characterized in that fluid passing ports are provided in the portions of at least either the separation membrane leaves or the partitions which are close to the rotary shaft thereof.

In the rotary separation apparatus using flat membranes according to the present invention, two separation membrane leaf elements may be employed. Namely, instead of the flat partition element, a separation membrane leaf element is employed in some cases.

Since the apparatus is constructed in this manner, a fluid to be treated is supplied in parallel with a low pressure loss to each membrane leaf through the fluid passing holes and carried to the outer circumferential portions of the membrane leaves by a centrifugal force, which occurs due to the relative rotational movements of the membrane leaves and partitions (the case that a separation membrane leaf element and a flat partition element are employed) or two membrane leaves the case that two separation membrane leaf elements are employed), as it is treated with the membranes. The fluid can then be discharged with a low pressure loss through the fluid passage provided at the outer circumferential portions and/or the outer side of the membrane leaves and partitions.

The further advantages of the present invention reside in that, since the passages for supplying a fluid in parallel to each membrane leaf are provided near the center of relative rotational movements of the membrane leaves and partition, the supplying and discharging of the fluid can be promoted by a centrifugal force.

In the case where the separation membrane element is immersed directly in a fluid to be treated the volume of which is sufficiently large in comparison with that of the membrane element and fluctuates little, without being held in a compact pressure resistant case, it seems that the supplying and discharging of a fluid to be treated can be done without any troubles in particular. However, in the case where the supplying and discharging of a fluid to be treated are not done forcibly by external power, so-called concentration polarization occurs on the membrane surfaces not only in the normal direction of the membranes but also in the radial direction of the membrane leaves since the fluid near the membrane element and that in the outside interchange with each other only at the outer circumferential portions of the membrane leaves. Moving a fluid to be treated by the relative rotational movements of the membrane leaves and partitions is effective in reducing the concentration polarization in the normal direction of the membranes but substantially no effect can be expected for the reduction of the concentration polarization in the radial direction of the membrane leaves. In order to reduce the latter concentration polarization, no other method is available than to diffuse the fluid by utilizing the radial concentration gradient as a driving force. In this case, the degree of decrease in the performance of the membranes due to concentration polarization is higher than in the case where a radial flow of the fluid exists (the scale of the concentration polarization is small), and this degree of decrease increases in proportion to the diameter of the membrane leaves.

In the separation membrane element in the present invention, fluid passing holes extending in parallel with the hollow shaft are provided in the portions of the membrane leaves which are in the vicinity of the hollow shaft, and these holes serve as ports into which the fluid to be treated is sucked by the centrifugal force. Consequently, a flow of the fluid in the radial direction of membrane leaves occurs simultaneously with a flow thereof in the circumferential direction thereof, so that the concentration polarization in the radial direction of the membrane leaves can be reduced effectively.

An embodiment of the third rotary separation apparatus using flat membranes according to the present inventional will now be described in detail.

Figure 8:
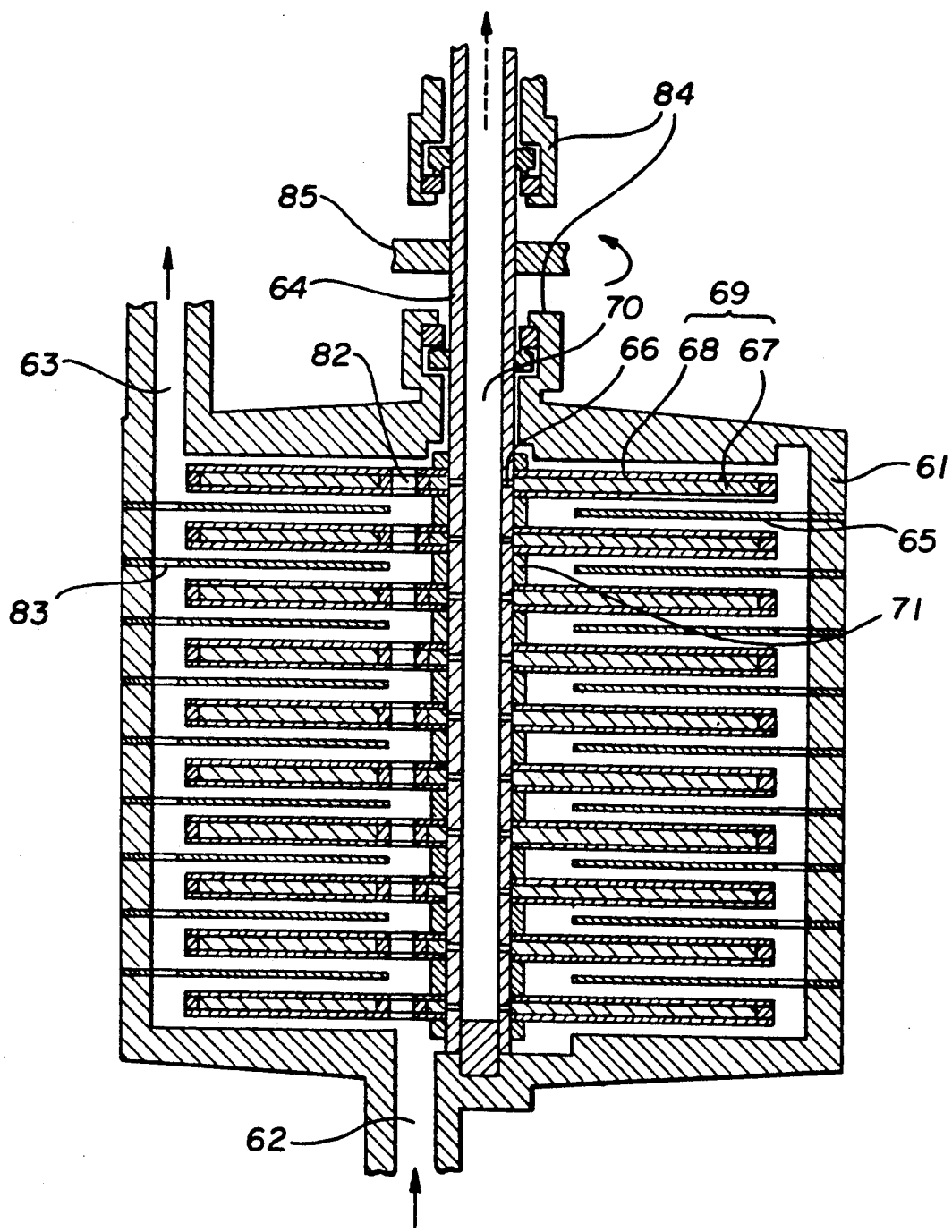
FIG. 8 is a longitudinal section of another embodiment of the apparatus according to the present invention.
Figure 9:
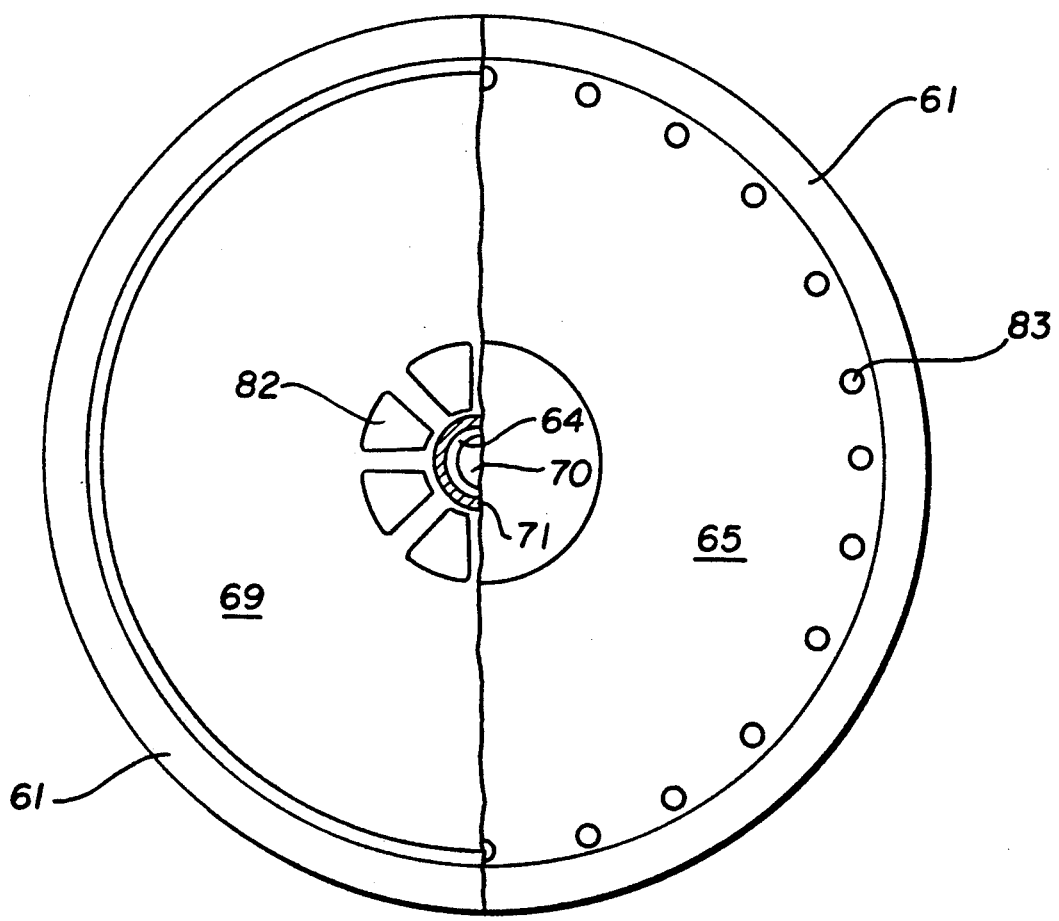
FIG. 9 is a horizontal section of the apparatus shown in FIG. 8 according to the present invention.

FIG. 8 is a longitudinal section of the embodiment of the present invention, and FIG. 9 a horizontal section thereof. The outer circumferential portion of FIG. 9 shows a cylindrical case 61, the left half portion of the inner circular part thereof the surface of a membrane leaf 69, and the right half portion thereof the surface of a partition 65.

Referring to FIG. 8, flat separation membrane leaves 69 in each of which separation membranes 68 are laminated on both surfaces of a flat support 67 with the outer circumferential portions thereof joined together with an adhesive and sealed are arranged in layers at regular intervals via spacers 71 and fitted firmly over a hollow rotary shaft 64. The flat support 67 is provided in its both surfaces with radially extending grooves, and a permeate flow passage formed between the support and separation membranes 68 lined with a non-woven cloth communicates with a hollow 70 of the rotary shaft 64 via small holes 66 provided in the same shaft. A membrane element comprising membrane leaves and hollow rotary shaft 64 is sealed liquid-tightly with annular spacers 71. Between adjacent membrane leaves 69, a partition 65 formed by punching a flexible film sheet is inserted, and inserted fixedly between adjacent rings of the cylindrical case 61 which is formed by laminating ring type units on one another, whereby the rotation of the partitions is prevented.

A fluid to be treated flows from a fluid feed port 62 provided at one end portion of the cylindrical case 61, and advances among the membrane leaves 69 with a low pressure loss through fluid passing holes 82 provided as feed flow passage in the inner circumferential portions of the membrane leaves 69. The fluid further flows between the surfaces of the rotating membrane leaves 69 and the non-rotating partitions 65, and the permeate through the membrane is lost, the remainder of the treated fluid reaching a condensate discharge port 63 through a fluid passing holes 83 provided as treated fluid discharge passages at the outer circumferential portions of the partitions 65, to flow out to the outside of the case.

The hollow rotary shaft 64 is supported on a bearing 84, and adapted to be rotated by a motor via a pulley 85 and a driving belt (not shown).

Figure 10:
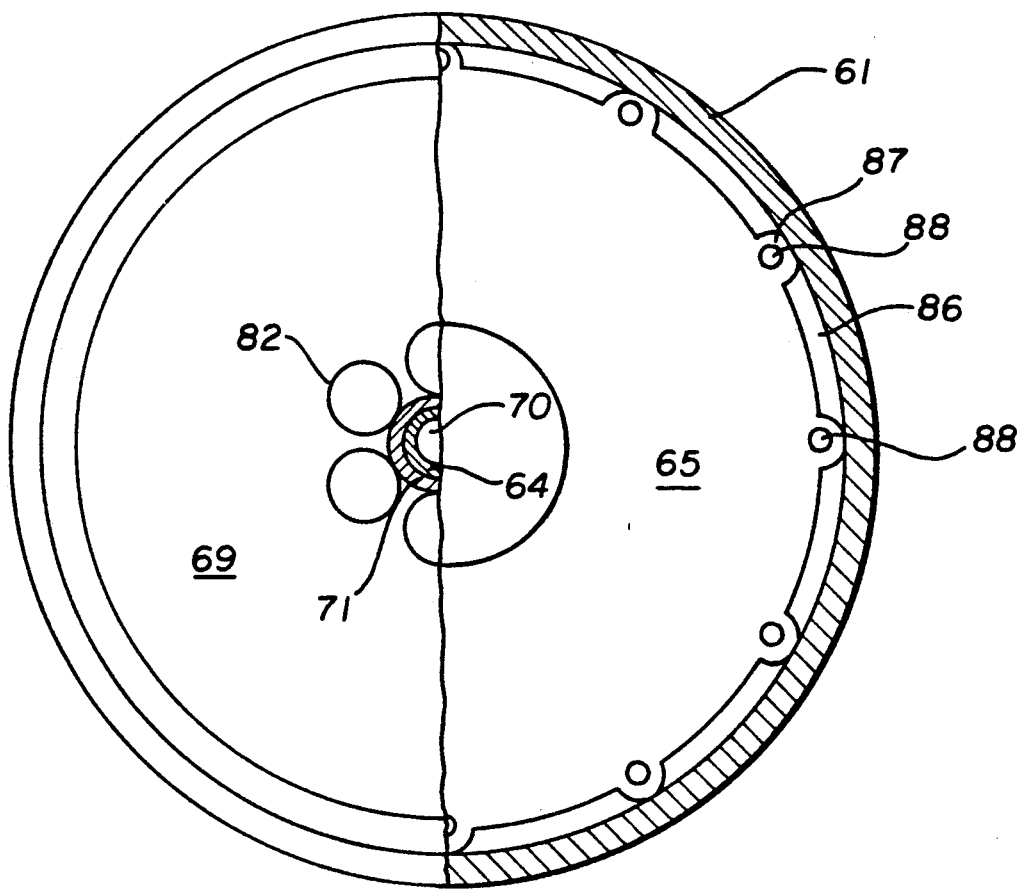
FIG. 10 is a horizontal section of another embodiment, i.e., the apparatus in Example 2 of the present invention.

In another embodiment, an integral cylinder instead of the cylindrical case 61 formed by laminating ring type units on one another in the above embodiment is used as a cylindrical case, and the embodiment using this case is shown in horizontal section in FIG. 10. A separation apparatus using membrane leaves 69 and partitions 65 the shapes of which are shown in FIG. 10 will now be described in detail. The outer circumferential portion of FIG. 10 shows a cylindrical case 61, the left half portion of the inner part thereof the surface of a membrane leaf 69, and the right half portion thereof the surface of a partition 65.

In this embodiment, the outer diameter of the partitions 65 is set smaller than the inner diameter of the cylindrical case 61, and a plurality of projections (lugs) 87 are provided on the outer circumferential portions of the partitions 65. A fluid to be treated is supplied to the membrane leaves 69 through fluid passing holes 82 provided in the inner circumferential portions of the membrane leaves 69, and reaches the outer circumferential portions of the membrane leaves as it is treated by the membranes and accelerated by a centrifugal force, the resultant fluid then flowing through a clearance 86 to be discharged from a condensed fluid discharge port 63 at the downstream end of the case to the outside. The rotation of the partitions 65 with the membrane leaves is prevented by making holes in the projections 87 at the outer circumferential portions of the partitions 65, passing rotation preventing rods 83 through these holes and fixing the rods to both end portions of the upper and lower walls of the cylindrical case 61.

Figure 11:
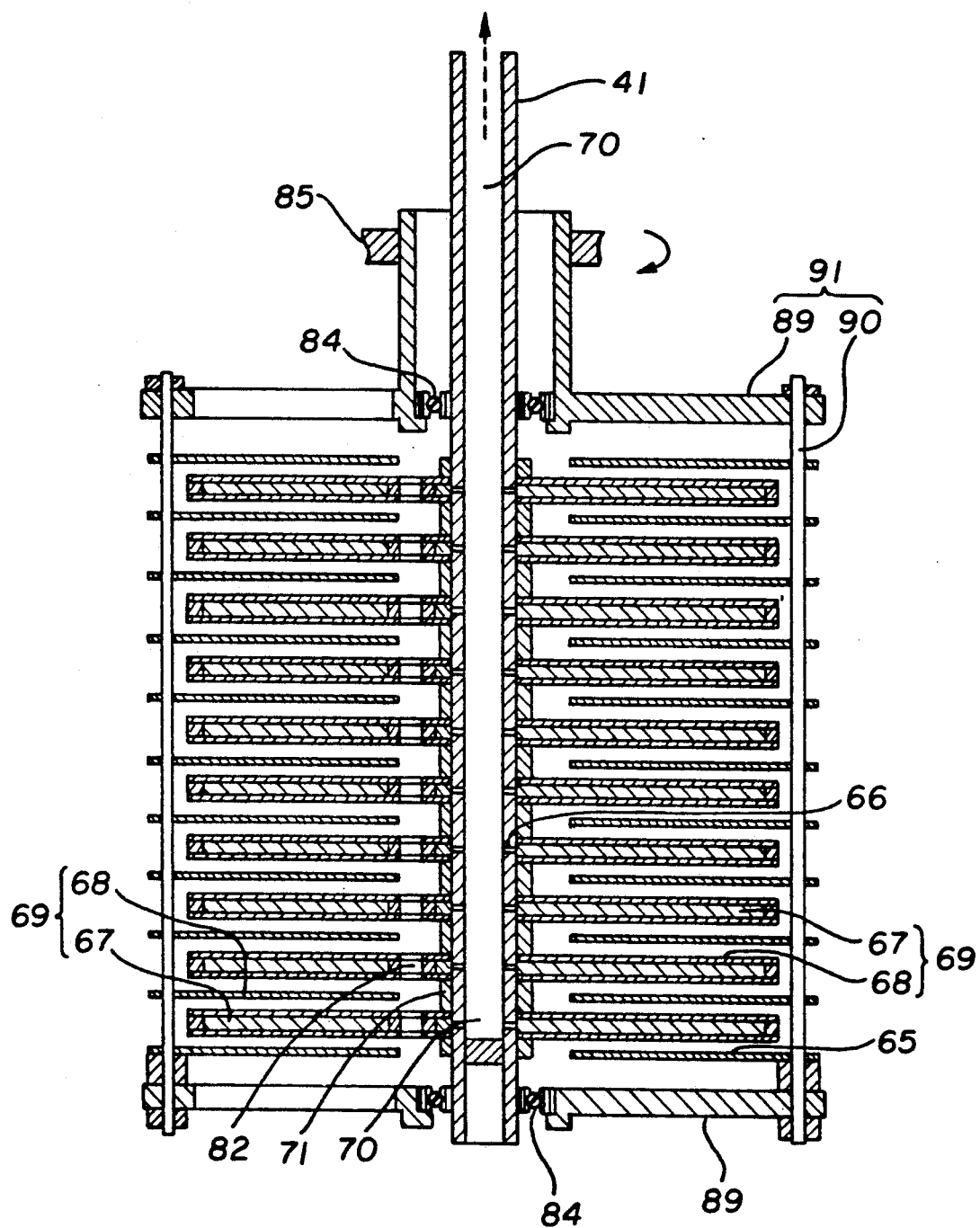
FIG. 11 is a longitudinal section of still another embodiment of the apparatus according to the present invention.

Still another embodiment in which separation membrane element is fixed and partitions 65 set rotatable is shown in FIG. 11. In this embodiment, membrane leaves 69 and partitions 65 identical those in the embodiment of FIG. 10 are used.

Referring to FIG. 11, flat separation membrane leaves 69 each of which is formed by laminating separation membranes 68 on both surfaces of a flat membrane support 67 and sealing the outer circumferential portion of the resultant product with an adhesive are arranged in layers at predetermined intervals via annular spacers 71 and fitted firmly over a hollow shaft 41.

The flat membrane support is cut out from screen mesh and has a flow passage therein for a permeate through the separation membranes 68 lined with nonwoven cloths, and this flow passage communicates with a hollow 70 of the shaft 41 via small holes 66 provided in the same shaft 41. A separation membrane element 69 comprising the membrane leaves 69 and hollow shaft 41 is combined liquid-tightly by the annular spacers 71. A lug-carrying annular partition 65 shown in the right half portion of FIG. 10 and former by punching a flexible film sheet is provided between each pair of adjacent membrane leaves 69, 69 and fixed to an outer frame 91 at the outer side of the membrane leaves 69. The outer frame 91 is provided on the hollow shaft 41 so that it can be rotated via bearings 84 and comprises of upper and lower wheels 89, 89 and a plurality of partition locking rods 90 by which the outer circumferential portions of the wheels 89, 89 are combined in parallel with the hollow shaft 41. Since the partition locking rods 90 are passed through the holes made in the lugs 87 of the partitions 65, the rotational movement of the outer frame, which is rotated by an external power source (not shown) via a pulley 85 and a driving belt (not shown), is transmitted to the partitions 65.

The fluid to be treated flows through a hole (not shown) provided between the axles of the upper and lower wheels 89, 89 or near the bearings 84, a clearance between the inner circumferential portions of the partitions 65 and annular spacers 71 and a fluid passing hole 82 provided at the inner circumferential portions of the membrane leaves 69, as it is accelerated by a centrifugal force occurring due to the rotation of the partitions 65, to be supplied to each membrane leaf 69, the fluid then reaching the outer circumferences of the membrane leaves 69 and partitions 65 through the clearance therebetween as it loses the permeate through the membrane, to be discharged to the outside.

As shown in FIG. 8, the separation membrane element in the apparatus according to the present invention described above has a rotary shaft 64 passed through the central portion thereof, and includes fluid passing holes 82 in the portion of each separation membrane leaf 69 which is close to the rotary shaft 64, and fluid passing holes 83 in the portion of each flat partition 65 which is close to the inner surface of the apparatus or case.

It is preferable that the fluid passing holes 82 provided in the vicinity of the rotary shaft 64 communicate with the rotary shaft 64 substantially in parallel therewith.

The shape of and the materials for the separation leaves 69 and partitions 65, the method of fitting the membrane leaves over the hollow rotary shaft and the construction and dimensions of the separation membrane element are identical with those described in the previous statement of other modes of rotary separation apparatuses using flat membranes according to the present invention.

According to the present invention, a rotary separation apparatus using flat membranes can be provided, which has one set of flat membrane leaves and one set of partitions or two membrane leaves arranged in layers alternately and in a mutually spaced manner so that the membrane leaves and partitions or second set of membrane leaves can be relatively rotated, and which is characterized in that fluid passing holes are provided at the inner circumferential portions of at least the membrane leaves or partitions fixed to a shaft positioned in the center of rotation, preferably substantially in parallel with the shaft, in such a manner that these holes communicate with each other, whereby a fluid to be treated can be supplied to the inner circumferential portions of the membrane leaves as it is accelerated by a centrifugal force occurring due to the rotation of the shaft, and then carried to the outer circumferential portions of the membrane surfaces and discharged to the outside of the apparatus, this effect enabling the performance of the membranes to be fully displayed even if the fluid to be treated is not fed and discharged forcibly by external power.

As described above, the third rotary separation apparatus using flat membranes according to the present invention may have two separation membrane elements and no partition element. In the first and second rotary separation apparatuses using flat membranes according to the present invention, the apparatuses can have two separation membrane elements and no partition element in some cases, for example, the apparatus shown in FIGS. 2 and 6.

EXAMPLES

The following Examples will further illustrate the present invention, which by no means limit the invention.

EXAMPLE 1

A nonwoven fabric having a thickness of 1.5 mm, a basis weight of 0.4 g/ml and an air permeability of 0.2 l/m$^2$·sec to be used as the inner layer was prepared from mainly polyester fibers having a thickness of 10 denier and a length of 50 mm. A sheet of a single nonwoven fabric having a thickness of 0.1 mm, a basis weight of 0.8 g/ml and an air permeability of 10 ml/cm$^2$·sec was prepared from mainly polyester fibers having a thickness of 3 denier and a length of 30 mm and superposed on both sides of the inner layer. The assembly was heated under pressure through hot rolls to form an integrated three-layered nonwoven fabric having a thickness of 1.7 mm. The nonwoven fabric was vertically put into a vessel containing a dope comprising 20% by weight of a polyether sulfone (trade name: Victrex mfd. by ICI), 20% by weight of Polyethylene Glycol 200 and 60% by weight of dimethyl sulfoxide both mfd. by Wako Pure Chemical Industries, Ltd., vertically pulled out downward through a slit having a width of 2 mm at the bottom of the vessel, and then continuously put into a water bath to form a membrane leaf in which the water level was set 20 cm below the slit. The membrane leaf was thoroughly washed with water and hot water to remove the solvent and then cut into doughnut-shaped pieces having an outer diameter of 8 cm and an inner diameter of 2 cm.

As shown in FIG. 1, an acrylic resin tube 2 having a diameter of 20 mm and 4 concyclic small pores having a 1 mm diameter was pierced through the doughnut-shaped separation membrane leaf 1 so that the inner layer of the doughnut-shaped separation membrane leaf 1 would communicate with the bore of the acrylic resin tube. Thereafter, the fitting part and the periphery of the separation membrane leaf were sealed with a polyurethane adhesive to form a separation membrane element. One end of the acrylic resin tube 2 was tightly stopped and the other end thereof was connected to a nitrogen gas supply line 6 and a vacuum line 7 via a pressure resistant tube 3, a trap 4, a pressure gauge 5 and ball valves. The separation membrane leaf 1 of this element was immersed in pure water 8 and the valve 9 of the vacuum line was opened to determine the pure water permeation flux by measuring the elevation of the water level in the trap; the flux was 240 l/m$^2$·h·kg/cm$^2$ (reduced value to 25° C.). Then the valve 9 of the vacuum line was closed and the valve 10 of the nitrogen gas supply line was opened to send back the permeate from the trap under a pressure of 1 kg/cm$^2$. The separation membrane leaf 1 gave a back permeation flux of 245 l/m$^2$·h·kg/cm$^2$ while retaining its original shape.

COMPARATIVE EXAMPLE

The sheet prepared for forming the surface layer in Example 1 was processed through hot rolls to form an ordinary nonwoven fabric. One surface of this fabric was protected by a polyethylene sheet. The polyether sulfone dope as used in Example 1 was cast over an unprotected surface of the fabric under the same conditions as those of Example 1 and the fabric thus treated was immersed in water. It was then washed with water and hot water in the same manner as that of Example 1 to obtain a flat membrane having a semipermeable membrane thereof. It was mounted on a flat membrane measuring cell to determine the pure water permeation flux thereof, which was 290 l/m$^2$·h·kg/cm$^2$ at reduced value to 25° C. It was cut into doughnut-shaped pieces having an outer diameter of 8 cm and an inner diameter of 2 cm (doughnut-shaped flat membrane). The flat membranes were placed on both sides of a nonwoven fabric having a thickness of 2 mm prepared from mainly a polyester fiber having a thickness of 10 denier and a length of 50 mm and the equivalent of the inner layer of the three-layered nonwoven fabric of Example 1 in such a manner that the semipermeable membrane faced outside to obtain a separation membrane leaf (without any heat press treatment). An element was prepared in the same manner as that of Example 1 by using the separation membrane leaf thus prepared. The pure water permeation flux was determined in the same manner as that described above, which was 250 l/m$^2$·h·kg/cm$^2$ at reduced value to 25° C. When the permeate in the trap was sent back under a pressure of 0.1 kg/cm$^2$, the flat membrane with the semipermeable membrane increased the thickness by about 2 mm.

EXAMPLE 2

A mesh screen (20-mesh, 0.68 mm thick, made of a polyester monofilament having a diameter of 0.32 mm) was superposed on a doughnut-shaped flat membrane made of the nonwoven fabric similar to that use in the above Comparative Example, the size of them being equal. A sealing polyurethane adhesive was applied to the periphery thereof and then the mesh screen was dotted with the same adhesive to form dots having a diameter of about 1 to 2 mm at intervals of about 5 mm. Immediately thereafter, another piece of the doughnut-shaped flat membrane was superposed thereon so that the nonwoven fabric faced inside. The whole was turned upside down (to face the bottom flat membrane upward). An acrylic resin plate of 1 cm in thickness was placed thereon and a weight of about 500 g was placed on the plate. The assembly was left to stand to cure the polyurethane adhesive. The separation membrane leaf thus prepared was hermetically bonded to an acrylic resin tube for taking out a permeate having an outer diameter of 20 mm with an adhesive in the same manner as that of Example 1 and Comparative Example to obtain an element. The pure water permeation flux thereof was determined to reveal that it was 240 $l/m^2 \cdot h \cdot kg/cm^2$. After the completion of the determination, the vacuum line was closed and the nitrogen gas supply line was opened to send back the permeate under a pressure of 1 $kg/cm^2$. The maximum expansion of the separation membrane leaf was below 0.3 mm and the pure water permeation flux was 250 $l/m^2 \cdot h \cdot kg/cm^2$.

EXAMPLE 3

A net (trade name: TRICAL N3; a net of Takiron Co., Ltd. made of a high-density polyethylene and having a thickness of 0.7 mm and an opening of 1.5×2.0 mm) was superposed on a doughnut-shaped flat membrane made of the nonwoven fabric similar to that used in Example 2, the size of them being equal. A sealing polyurethane adhesive was applied to the periphery thereof in the same manner as that of Example 2 and then the net was dotted with the same adhesive to form dots having a diameter of about 3 mm at an interval of about 8 mm. Immediately thereafter, another piece of the doughnut-shaped flat membrane was superposed thereon so that the nonwoven fabric faced inside. The whole was turned upside down and then the polyurethane adhesive was cured in the same manner as that of Example 2. The separation membrane leaf thus prepared was hermetically bonded to an acrylic resin tube for taking out a permeate having an outer diameter of 20 mm in the same manner as that of Examples 1 and 2 and Comparative Example to obtain an element. The pure water permeation flux thereof was determined to reveal that it was 200 $l/m^2 \cdot h \cdot kg/cm^2$. After the completion of the determination, the vacuum line was closed and the nitrogen gas supply line was opened to send back the permeate under a pressure of 0.5 $kg/cm^2$. The maximum expansion of the separation membrane leaf was below 0.5 mm and the pure water permeation flux was 200 $l/m^2 \cdot h \cdot kg/cm^{-2}$.

EXAMPLE 4

Figure 3:
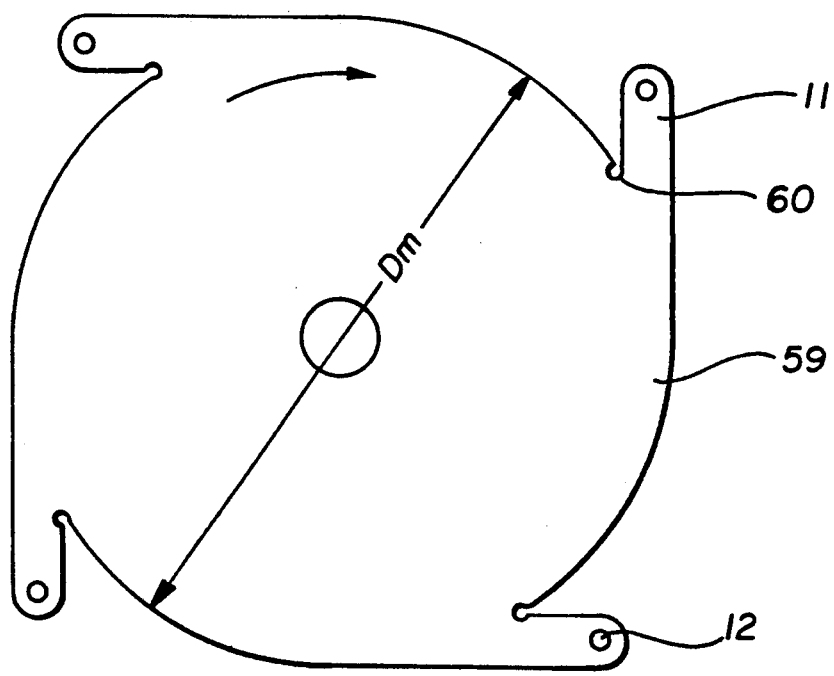
FIG. 3 is a plan view of a flexible partition used in the present invention.
Figure 12:
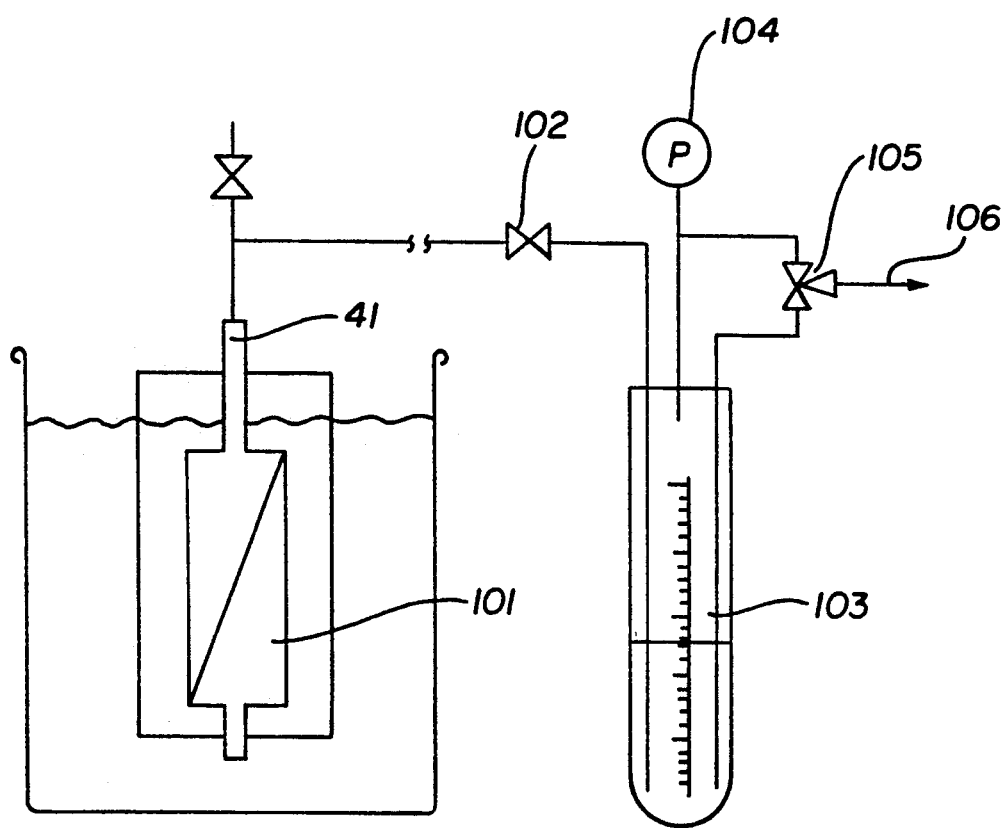
FIG. 12 is a schematic diagram of a system used to determine the performance of the rotary separation apparatus comprising flat membranes and another members according to the present invention.

FIG. 2 is a sectioned side elevation of an embodiment of the separation apparatus 51 using flat membranes according to the present invention, FIG. 3 a plan view showing a flexible partition used in the present invention, and FIG. 12 a schematic diagram of an apparatus used to determine the performance of a separation apparatus using membranes. An arrow in FIG. 3 designates the direction of rotation of the flexible partition.

In the separation apparatus 51 using flat membranes shown in FIG. 2, a flat membrane support 52, 13 cm in outer diameter, having a hole in the central portion thereof is made of screen mesh consisting of wires of 0.32 mm in diameter and having a 0.95 mm mesh size, and acrylonitrile ultrafiltration membranes DUY-L (manufactured by the Dicel Chemical Industries Co., Ltd.) are laminated on both surfaces of this support, the outer circumferential portion of the resultant product being sealed with an adhesive to obtain a membrane leaf 54. Membrane leaves 54 thus formed are arranged in layers at predetermined intervals via annular spacers 55, and the resultant product is fitted at its central portion over a hollow tube 56 to obtain a separation element using membranes. Such a separation element is used in this apparatus.

The permeate flow passages in the membrane leaves 54 communicate with a hollow 58 of a hollow tube 56 via small holes 57 made in the wall of the hollow tube 56, and a clearance between the membrane leaves 54 and the joint portions of the outer surface of the hollow tube 56 is sealed liquid-tightly with annular spacers 55.

Partitions 59 formed by punching a 0.3 mm thick polyethylene film are provided between adjacent membrane leaves 54, 54 and on the outer side of the uppermost and lowermost membrane leaves. A partition 59 of a shape shown in FIG. 3 consists of a circular plate of an outer diameter (Dm) of 13 cm equal to that of a membrane leaf 54, and has projections 11 and stress-break-up holes 60. This partition is engaged via holes 12 in the projections 11 with an outer frame (structure) 13 which is rotatable relatively to the membrane leaves 54. The partition 59 is shaped so that the movement thereof in the rotational direction is restricted by the outer frame 13 with the displacement thereof in the normal direction thereof (lengthwise direction of the hollow tube 56) not restricted.

The outer frame 13 is supported via a bearing 14, an outer cylinder 15 and a support plate 16. In this separation apparatus 51 using flat membranes, the hollow tube 56 combined unitarily with the membrane leaves is fixed (fixing means is not shown), and the outer frame 13 combined unitarily with the partitions is set rotatable by an external power source (not shown).

A separation apparatus using flat membranes 101 (separation apparatus using flat membranes 51 of FIG. 2) thus formed was immersed in a solution prepared by dissolving 30 g of albumen (manufactured by the Wako Junyaku Kogyo Co., Ltd.) and 75 g of water-soluble starch (manufactured by the Wako Junyaku Kogyo Co., Ltd.) in 15 l of buffer solution of phosphoric acid having a pH value of 6.7, and a non-immersed end portion of a hollow shaft 41 (hollow tube 56 of FIG. 2) was connected to a vacuum line 106 via a valve 102, a trap 103, a manometer 104 and a three-way valve 105 as shown in FIG. 12. An experiment of separation using membranes was conducted with the permeation side set under vacuum. The results are shown in Table 1.

TABLE 1

| Number of revolutions per second of partitions (rps) | Permeation flux ($l/m^2 \cdot h$) |
| --- | --- |
| 0 | 12 |
| 0.8 | 19 |
| 1.3 | 23 |

TABLE 1-continued

| Number of revolutions per second of partitions (rps) | Permeation flux (l/m² · h) |
|---|---|
| 1.8 | 25 |

The permeation flux increased as the number of revolutions per second of the partitions was increased. The partitions contacted upper membrane leaves while they were stopped, and were positioned halfway between adjacent membrane leaves while they were rotated.

EXAMPLE 5

A flat membrane support having an outer diameter of 13 cm and a hole in the center thereof was made of a 2 mm thick resin sheet of polymethyl methacrylate, and the same screen mesh as was used in a membrane support in Example 4 was laminated on one surface of the membrane support. An acrylonitrile ultrafiltration membrane DUY-L was laminated as a separation membrane on the screen mesh, and the outer circumferential portion of the resultant product was sealed with an adhesive to obtain a membrane leaf. Such membrane leaves were arranged in layers at predetermined intervals via annular spacers, and the resultant product was fitted at its central hole over a hollow tube to form a separation membrane element. An experiment was conducted in the same manner as that in Example 4 except that the membrane element thus obtained was used. The results are shown in Table 2.

TABLE 2

| Number of revolutions per second of partitions (rps) | Permeation flux (l/m² · h) |
|---|---|
| 0 | 12 |
| 0.8 | 18 |
| 1.3 | 23 |
| 1.8 | 24 |

Just as in Example 4, the permeation flux increased as the number of revolutions per second of the partitions was increased.

EXAMPLE 6

For the purpose of proving the effect of the fluid passing holes 82, a membrane leaf 69-1 was produced by cutting out a flat membrane support 67, 130 mm in outer diameter and 20 mm in inner diameter, from screen mesh having a wire diameter of 0.32 mm and a mesh of 0.95 mm, laminating acrylonitrile ultrafiltration membranes DUY-L (manufactured by the Dicel Chemical Industries Co., Ltd.) 68 on both surfaces of the support 67 with the active layers thereof directed outward, and sealing the outer circumferential portion of the resultant product with an adhesive. Four fluid passing holes 82, 10 mm in diameter, were provided in the portions of this membrane leaf 69-1 which were 5 mm away in the outward direction from the outer circumference of an O-ring-carrying annular spacer 71, and the circumferences of these holes were sealed with an adhesive.

For comparison, the same membrane leaf 69-2 except that it was not provided with the fluid passing holes 82 was produced.

Partitions 65, 130 mm in outer diameter and 45 mm in inner diameter, having four 90°-spaced outwardly projecting lugs were cut out from a 0.3 mm thick polyethylene film.

The separation membrane apparatus shown in FIG. 11 and described previously was made by the use of membrane leaves 69-1 or membrane leaves 69-2, and partitions 65 thus prepared. Namely, an apparatus using membrane leaves 69-1 and an apparatus using membrane leaves 69-2 were assembled to the same dimensions by using the same parts except the membrane leaves.

A rotary separation apparatus using flat membranes 101 thus formed was immersed in a solution prepared by dissolving 15 g of albumen (manufactured by the Wako Junyaku Kogyo Co., Ltd.) and 37 g of water-soluble starch (manufactured by the Wako Junyaku Kogyo Co., Ltd.) in 30 l of buffer solution of phosphoric acid (pH 6.7), and the upper end of a hollow shaft 41 was connected to a vacuum line 106 via a valve 102, a trap 103, a manometer 104 and a three-way valve 105 as shown in FIG. 12. An experiment of separation using membranes was conducted with the permeation side set to a negative pressure of 0.8 kg/cm². The results are shown in Table 3.

TABLE 3

| Number of revolutions per minute of partitions (rpm) | Permeation flux (l/m² · h) | |
|---|---|---|
| | Membrane leaf 69-1 (having fluid passing holes 82) | Membrane leaf 69-2 (having no fluid passing holes 82) |
| 0 | 21 | 23 |
| 20 | 41 | 28 |
| 40 | 52 | 32 |
| 60 | 60 | 36 |

It is clear from the results shown in Table 3 that the fluid passing holes 82 have an excellent effect. It is expected that this effect increases as the outer diameter of the membrane leaves is increased. In the case of membrane leaves having no fluid passing holes, only the concentration gradient serves as a driving force for reducing the radial concentration polarization because of the centrifugal force which increases in proportion to a square of the radius of the membrane leaf, while the contration polarization reducing driving force increases in inverse proportion to the radius of the membrane leaves.

What is claimed is:

1. A flat separation membrane leaf consisting essentially of: a flat membrane support including an inner layer having a coarse structure having large voids and surface layers including a nonwoven fabric having a dense structure made of fine fibers and having small openings, said surface layers being partially adhered to both sides of the inner layer with an adhesive or heat-fused sufficient to be integrated with the inner layer, and semipermeable membranes coating both sides of the support in such a manner that the polymer constituting the semipermeable membranes penetrates into the openings of the nonwoven fabrics of the surfaces of the support to combine the semipermeable membranes with the surfaces of the support and means for enabling installation of said leaf within a rotary separation apparatus having at least one substantially flexible partition for contacting said leaf; said leaf being designed, sized and dimensioned to be sufficiently less flexible than said partition sufficient to substantially preclude vertical vibrating and flapping of said leaf and coact with said partition to produce turbulent flow within said apparatus during its operation.

2. The flat separation membrane leaf according to claim 1, wherein the inner layer is at least one layer selected from the group consisting of a nonwoven fabric made of thick fibers and having a coarse structure having large voids, a woven tricot fabric having a high void volume and made of thick fibers, a woven pile fabric having a high void volume and made of thick fibers, a mesh screen having a high void volume and a net-shaped molding prepared by the melt extrusion of a thermoplastic polymer into filaments.

3. The flat separation membrane leaf according to claim 1, wherein the semipermeable membrane is asymmetric one prepared by the phase inversion method.

4. The flat separation membrane leaf according to claim 1, wherein the semipermeable membrane is a composite membrane comprising, as a support layer, an asymmetric membrane prepared by the phase inversion method.

5. The flat separation membrane leaf according to claim 1, wherein the semipermeable membrane is an ultrafiltration membrane or a microfiltration membrane.

6. The flat separation membrane leaf according to claim 1, wherein the semipermeable membrane is a reverse osmosis membrane, gas separation membrane, pervaporation membrane, vapor permeation membrane or perstraction membrane.

7. A flat separation membrane element which comprises, as the essential conmponent, the flat separation membrane leaf according to claim 1.

8. In a rotary separation apparatus, the improvement comprising: at least one substantially flexible partition and a flat separation membrane leaf for being contacted by said partition, said leaf consisting essentially of a flat membrane support including an inner layer having a coarse structure having large voids and surface layers including a nonwoven fabric having a dense structure made of fine fibers and having small openings, said surface layers being partially adhered to both sides of the inner layer with an adhesive or heat-fused sufficient to be integrated with the inner layer, and semipermeable membranes coating both sides of the support in such a manner that the polymer constituting the semipermeable membranes penetrates into the openings of the nonwoven fabrics of the surfaces of the support to combine the semipermeable membranes with the surfaces of the support and means for enabling installation of said leaf within said rotary separation apparatus; said leaf being designed, sized and dimensioned to be sufficiently less flexible than said partition sufficient to substantially preclude vertical vibrating and flapping of said leaf and coact with said partition to produce turbulent flow within said apparatus during its operation.

9. The rotary separation apparatus using flat membranes according to claim 8, wherein the apparatus comprises a separation membrane element having separation membrane leaves sealed liquid-tightly at their outer circumferential portions and arranged in layers unitarily at predetermined intervals on a hollow tube which passes through the membrane leaves, in which membrane element the hollow of the hollow tube and the inner layers of the separation membrane leaves communicate with each other with the joint portions thereof liquid-tightly sealed, and a structure provided with partitions as its structural elements and positioned on the outer side of the membrane element, the partitions being engaged with the structure so that the movement of the partitions in the rotational direction thereof is restricted by the structure and so that the partitions can be displaced in the direction which is at right angles to the rotational direction (normal direction of the partitions or axial direction of the hollow tube) of the structure.

10. The rotary separation apparatus using flat membranes according to claim 9, wherein the partitions comprise a soft flexible material and have projections extending substantially in the outer circumferential direction of the partitions and of which extending direction is opposite to the relative rotational direction of the partitions, and stress-break-up smoothly curved recesses at the root portions of the projections.

11. The rotary separation apparatus using flat membranes according to claim 8, wherein the feed flow passage and the discharge flow passage are provided in symmetric and opposed positions with respect to the hollow rotary shaft.

12. The rotary separation apparatus using flat membranes according to claim 8, wherein the flat partitions are flexible and capable of being displaced in the lengthwise (axial) direction of the rotary shaft.

13. The rotary separation apparatus using flat membranes according to claim 8, wherein the preventing of rotation of the flat partitions with the membrane leaves is done by fastening means provided in the feed flow passage and/or the discharge flow passage.

14. The rotary separation apparatus using flat membranes according to claim 8, wherein at least either the separation membrane leaves or the flat partitions have a flexibility.

15. The rotary separation apparatus using flat membranes according to claim 8, wherein a hollow rotary shaft is passed through the separation membrane leaves in the separation membrane element, the permeate flow passages in the membrane leaves and the hollow of the hollow rotary shaft communicating with each other via small holes in the wall of the rotary shaft, the joint portions of the membrane leaves and the rotary shaft being sealed liquid-tightly against the exterior thereof, the hollow of the hollow rotary shaft constituting an outlet from which the permeated liquid is discharged.

16. The rotary separation apparatus using flat membranes according to claim 8, wherein the rotary shaft is passed through the central portion of the separation membrane leaves in the separation membrane element, each of the separation membrane leaves being provided with a fluid passing port in the portion thereof which is close to the rotary shaft, each of the flat partitions being provided with a fluid passing port in the portion thereof which is close to the inner surface of the apparatus.

17. The rotary separation apparatus using flat membranes according to claim 8, wherein the fluid passing ports provided in the portions of the membrane leaves and/or the partitions which are close to the rotary shaft communicate with each other/substantially in parallel with the rotary shaft.

18. The rotary separation apparatus using flat membranes according to claim 8, wherein at least either the separation membrane leaves or the flat partitions have a flexibility.

* * * * *